US012716994B2

(12) United States Patent
Park et al.

(10) Patent No.: US 12,716,994 B2
(45) Date of Patent: Aug. 25, 2026

(54) HIGH-RESOLUTION IMAGING RADAR APPARATUS AND OPERATING METHOD THEREOF

(71) Applicant: ELECTRONICS AND TELECOMMUNICATIONS RESEARCH INSTITUTE, Daejeon (KR)

(72) Inventors: Pil Jae Park, Daejeon (KR); Jungsoo Kim, Daejeon (KR); Il Min Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 509 days.

(21) Appl. No.: 18/194,733

(22) Filed: Apr. 3, 2023

(65) Prior Publication Data

US 2023/0358858 A1 Nov. 9, 2023

(30) Foreign Application Priority Data

May 3, 2022 (KR) ........................ 10-2022-0054794

(51) Int. Cl.

*G01S 7/35* (2006.01)
*G01S 7/03* (2006.01)
*G01S 7/282* (2006.01)

(52) U.S. Cl.

CPC .............. *G01S 7/352* (2013.01); *G01S 7/032* (2013.01); *G01S 7/282* (2013.01)

(58) Field of Classification Search

CPC .......... G01S 7/352; G01S 7/032; G01S 7/282; G01S 13/89; G01S 7/35; H03M 1/12
See application file for complete search history.

(56) References Cited

U.S. PATENT DOCUMENTS

| | | | |
|---|---|---|---|
| 5,945,938 | A | 8/1999 | Chia et al. |
| 10,705,406 | B2 | 7/2020 | Kim et al. |
| 10,777,882 | B2 | 9/2020 | Cho et al. |
| 11,448,754 | B2 | 9/2022 | Cattle et al. |

(Continued)

FOREIGN PATENT DOCUMENTS

| | | | |
|---|---|---|---|
| EP | 3872929 | A1 | 9/2021 |
| JP | 2020-153872 | A | 9/2020 |

(Continued)

*Primary Examiner* — William Kelleher
*Assistant Examiner* — Ismaaeel A. Siddiquee
(74) *Attorney, Agent, or Firm* — Rabin & Berdo, P.C.

(57) ABSTRACT

An imaging radar apparatus for obtaining an image includes a plurality of transmission modules and a plurality of reception modules. Each of the plurality of transmission modules includes a main controller, a first printed circuit board, a transmission controller, a plurality of transmitters, and a plurality of transmit antennas. Each of the plurality of reception modules includes a second printed circuit board, a reception controller, a plurality of receivers, and a plurality of receive antennas. A transmission unit including the plurality of transmitters is disposed on a top surface of the first printed circuit board. The plurality of transmit antennas are linearly arranged on the top surface of the first printed circuit board. The transmission controller is disposed on a bottom surface of the first printed circuit board. A reception unit including the plurality of receivers is disposed on a bottom surface of the second printed circuit board.

14 Claims, 12 Drawing Sheets

(56) References Cited

U.S. PATENT DOCUMENTS

| | | | | |
|---|---|---|---|---|
| 2008/0317186 | A1* | 12/2008 | Vaananen | H03L 7/197 375/376 |
| 2010/0073222 | A1* | 3/2010 | Mitomo | G01S 7/35 342/175 |
| 2012/0268344 | A1* | 10/2012 | McCarthy | H01Q 21/0093 343/893 |
| 2013/0249772 | A1* | 9/2013 | Infante | H01Q 21/0093 343/893 |
| 2014/0240691 | A1* | 8/2014 | Mheen | G01S 17/89 356/4.07 |
| 2017/0230129 | A1 | 8/2017 | Yoo et al. | |
| 2019/0120932 | A1* | 4/2019 | Smith | G01S 7/2921 |
| 2021/0286069 | A1 | 9/2021 | Kim et al. | |
| 2021/0322793 | A1 | 10/2021 | Lee et al. | |
| 2022/0050176 | A1 | 2/2022 | Kishigami | |
| 2022/0099817 | A1* | 3/2022 | Crouch | G01S 13/426 |
| 2023/0213614 | A1* | 7/2023 | Choi | G01S 7/354 342/107 |

FOREIGN PATENT DOCUMENTS

| | | | |
|---|---|---|---|
| KR | 1020150089749 | A | 8/2015 |
| KR | 1020160011443 | A | 2/2016 |
| KR | 1020180055298 | A | 5/2018 |
| KR | 10-2021-0093967 | A | 7/2021 |
| KR | 10-2021-0115194 | A | 9/2021 |

* cited by examiner

HIGH-RESOLUTION IMAGING RADAR APPARATUS AND OPERATING METHOD THEREOF

CROSS-REFERENCE TO RELATED APPLICATIONS

This application claims priority under 35 U.S.C. § 119 to Korean Patent Application No. 10-2022-0054794 filed on May 3, 2022, in the Korean Intellectual Property Office, the disclosures of which are incorporated by reference herein in their entireties.

BACKGROUND

Embodiments of the present disclosure described herein relate to a radar apparatus, and more particularly, relate to a radar for obtaining a high-resolution microwave image.

An imaging radar apparatus may transmit and receive a radio wave. A transmitter of the imaging radar apparatus may radiate a microwave through a transmit antenna. A receiver of the imaging radar apparatus may receive a reflected wave from a target and may perform image processing of the reflected wave to obtain an image. The imaging radar apparatus may detect a direction and a location of an object which reflects the transmitted radio wave. The radio wave used in the imaging radar apparatus may have a frequency of a band of several MHz to several tens of GHz. The imaging radar apparatus may receive the reflected wave to obtain information of the target. The information of the target may include a location of the target, a speed of the target, operation information of the target, and the like.

The imaging radar apparatus may use a plurality of transmitters and a plurality of receivers to obtain an image having high spatial resolution. The imaging radar apparatus may use a high-frequency band (e.g., a millimeter wave) to obtain an image with high resolution. A transmit antenna and a receive antenna of the imaging radar apparatus may be arranged on a plane. The imaging radar apparatus may operate the transmitter and the receiver and may analyze a signal obtained by the receiver to obtain an image.

SUMMARY

Embodiments of the present disclosure provide an imaging radar apparatus for obtaining a high-resolution image and an operating method thereof.

According to an embodiment, an imaging radar apparatus for obtaining an image may include a plurality of transmission modules and a plurality of reception modules. Each of the plurality of transmission modules may include a main controller, a first printed circuit board, a transmission controller, a plurality of transmitters, and a plurality of transmit antennas. Each of the plurality of reception modules may include a second printed circuit board, a reception controller, a plurality of receivers, and a plurality of receive antennas. A transmission unit including the plurality of transmitters may be disposed on a top surface of the first printed circuit board. The plurality of transmit antennas may be linearly arranged on the top surface of the first printed circuit board. The transmission controller may be disposed on a bottom surface of the first printed circuit board. A reception unit including the plurality of receivers may be disposed on a bottom surface of the second printed circuit board. The plurality of receive antennas may be linearly arranged on a top surface of the second printed circuit board. The reception controller may be disposed on the bottom surface of the second printed circuit board. A transmission and reception surface may have a structure where polygons are repeatedly arranged. The plurality of transmission modules may be arranged on lines of at least one of the polygons of the transmission and reception surface, and the plurality of reception modules may be arranged on lines of at least one of the polygons of the transmission and reception surface.

In an embodiment, the transmission controller may generate and output a first control signal and a reference frequency signal to the plurality of transmitters. The plurality of transmit antennas may radiate a transmission wave to an external target, and the plurality of transmitters may be connected with the plurality of transmit antennas, respectively. The reception controller may generate and output a second control signal and a local signal to the plurality of receivers. The plurality of receive antennas may receive a reflected wave from the external target, and the plurality of receivers may be connected with the plurality of receive antennas, respectively.

In an embodiment, the transmission controller may include a phase-locked loop (PLL) and may control the reference frequency signal by means of the PLL. The transmission controller may control a center frequency, transmit power, and modulation of each of the plurality of transmitters by means of the first control signal. The transmission controller may communicate with the main controller. The transmission controller may be implemented as an integrated circuit chip, and the transmission unit may be implemented as an integrated circuit chip.

In an embodiment, the transmission controller may receive a reference clock signal from the main controller, may generate the reference frequency signal based on the reference clock signal, and may output the reference frequency signal to the transmission unit. The transmission controller may control a frequency and a phase of the reference frequency signal to generate a first modulation signal in the first control signal. The first control signal may be an analog signal or a digital signal.

In an embodiment, the reception controller may include a phase-locked loop (PLL) and an analog-to-digital converter (ADC). The reception controller may control the local signal by means of the PLL. The reception controller may control a gain and sensitivity of each of the plurality of receivers by means of the second control signal. The reception controller may convert a receive signal provided from the plurality of receivers into a digital signal by means of the ADC. The reception controller may communicate with the main controller. The reception controller may be implemented as an integrated circuit chip, and the reception unit may be implemented as an integrated circuit chip.

In an embodiment, the reception controller may receive a reference clock signal from the main controller, may generate the local signal based on the reference clock signal, and may output the local signal to the reception unit. The reception controller may control a frequency and a phase of the local signal to generate a second modulation signal in the second control signal. The ADC of the reception controller may include a selection unit and a conversion unit. The selection unit may select one of a plurality of receive signals provided from the plurality of receivers. The conversion unit may convert the selected receive signal into a digital signal. The second control signal may be an analog signal or a digital signal.

In an embodiment, the polygon may be a hexagon. A plurality of Y-shaped edges may be formed along boundary surfaces where a plurality of hexagons of the transmission and reception surface are adjacent to each other. The plurality of transmission modules may be arranged on a first Y-shaped edge among the plurality of Y-shaped edges. The plurality of reception modules may be arranged on a second Y-shaped edge among the plurality of Y-shaped edges.

In an embodiment, the transmission controller may selectively activate the plurality of transmitters, and the reception controller may selectively activate the plurality of receivers.

In an embodiment, the transmission controller may activate the plurality of transmitters based on an activation order. The plurality of transmit antennas may be activated based on the activation order.

In an embodiment, the main controller may receive a digital signal from the plurality of reception modules and may perform a signal processing operation for the digital signal to generate an image.

In an embodiment, the signal processing operation may include a Fourier transform. The main controller may apply a filter having a different frequency response for each location of the reception module, in performing the signal processing operation.

According to an embodiment of the present disclosure, each of a plurality of transmission modules may include a first printed circuit board, a transmission controller, a plurality of transmitters, and a plurality of transmit antennas. Each of a plurality of reception modules may include a second printed circuit board, a reception controller, a plurality of receivers, and a plurality of receive antennas. An imaging radar apparatus may be configured, including a main controller, the plurality of transmission modules, and the plurality of reception modules, and may obtain an image of a target using them. The operation of the imaging radar apparatus may include the following operations. There may be sequentially activating, by the main controller, the plurality of transmission modules, sequentially activating, by the transmission controller of the transmission module, the plurality of transmitters of the transmission module, and activating, by the main controller, the plurality of reception module at the same time. A transmission unit including the plurality of transmitters may be disposed on a top surface of the first printed circuit board. The plurality of transmit antennas may be linearly arranged on the top surface of the first printed circuit board. The transmission controller may be disposed on a bottom surface of the first printed circuit board. A reception unit including the plurality of receivers may be disposed on a bottom surface of the second printed circuit board. The plurality of receive antennas may be linearly arranged on a top surface of the second printed circuit board. The reception controller may be disposed on the bottom surface of the second printed circuit board. In a transmission and reception surface having a structure where polygons are repeatedly arranged, the plurality of transmission modules may be arranged on lines of at least one of the polygons of the transmission and reception surface. The plurality of reception modules may be arranged on lines of at least one of the polygons of the transmission and reception surface.

In an embodiment, the imaging radar apparatus may have the activating of the plurality of reception modules at the same time by the main controller. This operation may be activating all the plurality of receivers of each of the plurality of reception modules at the same time or activating some of the plurality of receivers of each of the plurality of reception modules at the same time. The receivers of the activated reception modules may operate at the same time, when a transmit antenna corresponding to the activated transmitter radiates a transmission wave.

In an embodiment, the sequential activating of the plurality of transmission modules may include sequentially activating the plurality of transmission modules based on a first activation order. The sequential activating of the plurality of transmitters of the transmission module may include sequentially activating the plurality of transmitters of the transmission module based on a second activation order. The first and second activation orders may be variable according to a response of a reflected wave received through the plurality of receive antennas.

In an embodiment, the imaging radar apparatus may include receiving, by the main controller, a digital signal into a receive signal is converted from the plurality of reception modules. The imaging radar apparatus may include performing, by the main controller, a signal processing operation for the digital signal to convert the digital signal into an image. The signal processing operation may include a Fourier transform. The main controller may apply a filter having a different frequency response for each location of the reception module corresponding to the digital signal, in performing the signal processing operation.

BRIEF DESCRIPTION OF THE FIGURES

The above and other objects and features of the present disclosure will become apparent by describing in detail embodiments thereof with reference to the accompanying drawings.

DETAILED DESCRIPTION

Below, embodiments of the present disclosure may be described in detail and clearly to such an extent that an ordinary one in the art easily implements the invention.

Unless otherwise defined, all terms used herein, which include technical terminologies or scientific terminologies, have the same meaning as that understood by a person skilled in the art to which the present invention belongs. Terms defined in a generally used dictionary are to be interpreted to have meanings equal to the contextual meanings in a relevant technical field, and are not interpreted to have ideal or excessively formal meanings unless clearly defined in the specification.

Hereinafter, the terms “unit”, “module”, “layer”, or function blocks illustrated in drawings may be implemented in the form of software, hardware, a combination thereof.

Illustratively, the software may be a machine code, firmware, an embedded code, and application software. For example, the hardware may include an electrical circuit, an electronic circuit, a processor, a computer, an integrated circuit, integrated circuit cores, a pressure sensor, an inertial sensor, a microelectromechanical system (MEMS), a passive element, or a combination thereof.

Figure 1:
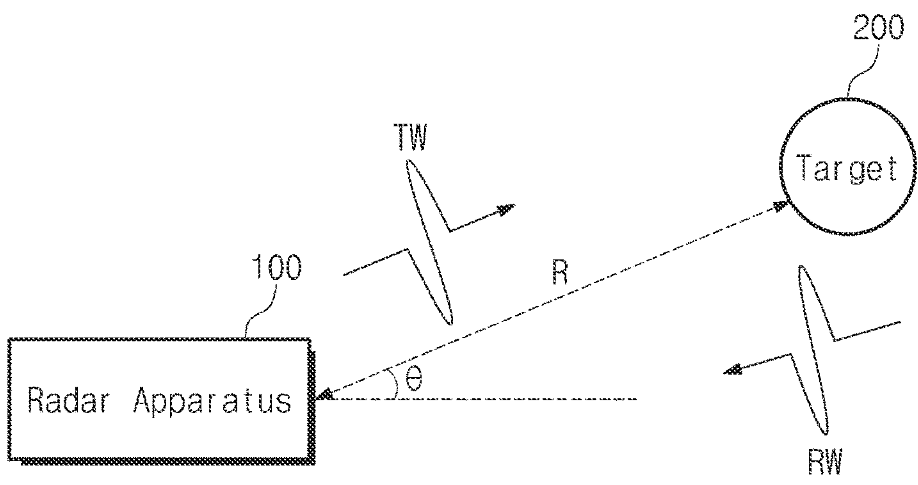
FIG. 1 is a drawing illustrating a schematic operation of a radar apparatus according to an embodiment of the present disclosure.

FIG. 1 is a drawing illustrating a schematic operation of a radar apparatus according to an embodiment of the present disclosure. Referring to FIG. 1, a radar apparatus 100 may radiate a transmission wave TW towards a target 200. For example, the transmission wave TW may include an electromagnetic wave such as a radio wave, an infrared ray, a visible ray, an ultraviolet ray, an X-ray, a gamma ray, or a microwave. The radar apparatus 100 may receive a reflected wave RW where the transmission wave TW is reflected from the target 200 to return. The radar apparatus 100 may analyze the reflected wave RW to obtain information about the target 200. For example, the radar apparatus 100 may radiate a microwave towards the target 200. The radar apparatus 100 may receive the reflected wave RW from the target 200 and may obtain an image. The radar apparatus 100 may obtain a high-resolution image using a signal of a high frequency band (e.g., a millimeter wave). The radar apparatus 100 may be an imaging radar apparatus.

The information about the target 200, which is capable of being obtained by the radar apparatus 100, may include a distance R from the radar apparatus 100 to the target 200 and an azimuth angle θ formed by the radar apparatus 100 and the target 200. The target 200 may include a moved object as well as a fixed object. The radar apparatus 100 may obtain location information and speed information of the target 200 from the distance R and the azimuth angle θ of the target 200. For example, the radar apparatus 100 may generate a radar image indicating a location of the target 200.

In an embodiment, the target 200 may be located in front of the radar apparatus 100. The radar apparatus 100 may obtain a microwave image for the target 200. The radar apparatus 100 may include a plurality of transmitters and a plurality of receivers. The radar apparatus 100 may obtain an image having high spatial resolution by using the plurality of transmitters and the plurality of receivers. The high spatial resolution may be the distance direction R and the azimuth angle direction Θ. To obtain an image, a transmit antenna and a receive antenna in the radar apparatus 100 may be arranged on a plane or a curved surface. The radar apparatus 100 may analyze the signal obtained by the receiver to obtain an image.

Figure 2:
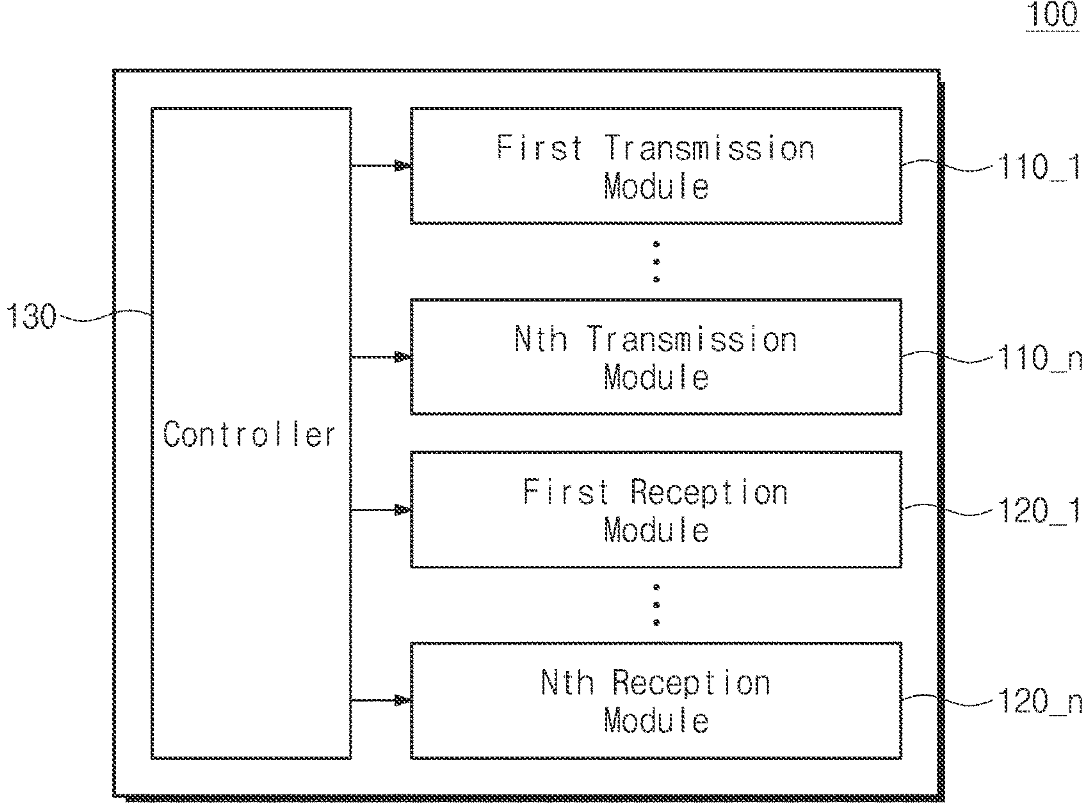
FIG. 2 is a block diagram illustrating an example of a radar apparatus of FIG. 1.

FIG. 2 is a block diagram illustrating an example of a radar apparatus of FIG. 1. Referring to FIG. 2, a radar apparatus 100 may include a plurality of transmission modules and a plurality of reception modules. In an embodiment, the radar apparatus 100 may include first to nth transmission modules 110_1 to 110__n_, first to nth reception modules 120_1 to 120__n_, and a controller 130. The scope of the present disclosure is not limited thereto. The number of transmission modules and the number of reception modules may increase or decrease depending on an implementation manner. The configuration and operation method of each of the plurality of transmission modules 110_1 to 110__n_ will be described in detail with reference to FIG. 4. The configuration and operation method of each of the plurality of reception modules 120_1 to 120__n_ will be described in detail with reference to FIG. 5.

The controller 130 may control the overall operation of the radar apparatus 100. The controller 130 may communicate with the plurality of transmission modules 110_1 to 110__n_. An each of the plurality of transmission modules 110_1 to 110__n_ may be corresponding to a transmission module 110 of FIG. 4. The controller 130 may communicate with a transmission controller 111 (refer to FIG. 4) of a transmission module 110 (refer to FIG. 4). The controller 130 may communicate with the plurality of reception modules 120_1 to 120__n_. An each of the plurality of reception modules 120_1 to 120__n_ may be corresponding to a reception module 120 of FIG. 5. The controller 130 may communicate with a reception controller 121 (refer to FIG. 5) of a reception module 120 (refer to FIG. 5).

The controller 130 may generate signals necessary for control of the radar apparatus 100. The controller 130 may transmit the generated signals to the plurality of transmission modules 110_1 to 110__n_ or the plurality of reception modules 120_1 to 120__n_. The controller 130 may generate a reference clock signal CLK. The controller 130 may output the reference clock signal CLK to the plurality of transmission modules 110_1 to 110__n_ and the plurality of reception modules 120_1 to 120__n_.

The controller 130 may selectively activate the plurality of transmission modules 110_1 to 110__n_. For example, the controller 130 may activate all the plurality of transmission modules 110_1 to 110__n_. Alternatively, the controller 130 may activate some of the plurality of transmission modules 110_1 to 110__n_. The controller 130 may operate only some of the plurality of transmission modules 110_1 to 110__n_ by means of a transmit active signal. For example, the controller 130 may set second and third transmit active signals to an active state (e.g., a logic high) and may set a first transmit active signal to an inactive state (e.g., a logic low) to maintain the first transmission module 110_1 in the inactive state (i.e., may not operate the first transmission module 110_1) and may operate only the second transmission module 110_2 and the third transmission module 110_3.

The controller 130 may selectively activate the plurality of reception modules 120_1 to 120__n_. For example, the controller 130 may activate all the plurality of reception modules 120_1 to 120__n_. Alternatively, the controller 130 may activate some of the plurality of reception modules 120_1 to 120__n_. The controller 130 may operate only some of the plurality of reception modules 120_1 to 120__n_ by means of a receive active signal. For example, the controller 130 may set second and third receive active signals to an active state (e.g., a logic high) and may set a first receive active signal to an inactive state (e.g., a logic low) to maintain the first reception module 120_1 in the inactive state (i.e., may not operate the first reception module 120_1) and may operate only the second reception module 120_2 and the third reception module 120_3.

The controller 130 may sequentially operate the plurality of transmission modules 110_1 to 110__n_. In detail, the controller 130 may activate the plurality of transmission modules 110_1 to 110__n_, based on an activation order of the plurality of transmission modules 110_1 to 110__n_. For example, the activation order is to activate the first transmission module 110_1, then activate the second transmission module 110_2, and then activate the third transmission module 110_3. In this case, the controller 130 may operate the first transmission module 110_1, may then operate the second transmission module 110_2, and may then operate the third transmission module 110_3.

The controller 130 may change the activation order of the plurality of transmission modules 110_1 to 110__n_. The controller 130 may variably change the activation order of the plurality of transmission modules 110_1 to 110__n_ based on a reflected wave RW (refer to FIG. 1) from a target 200

(refer to FIG. 1). In other words, the activation order may be variable according to a response of the reflected wave RW. The activation order may be variable based on a receive signal RS received through a receive antenna. For example, the controller 130 may change the activation order (e.g., an order of the first transmission module 110_1, the second transmission module 110_2, and the third transmission module 110_3). The changed activation order may be to activate the third transmission module 110_3, then activate the second transmission module 110_2, and then activate the first transmission module 110_1. In this case, the controller 130 may operate the third transmission module 110_3, may then operate the second transmission module 110_2, and may then operate the first transmission module 110_1.

In an embodiment, the activation order may be predetermined. In detail, the activation order may be set to obtain a high-resolution image. The activation order may be fixed or varied by a designer, a manufacturer, and/or a user.

When sequentially operating the plurality of transmission modules 110_1 to 110_*n*, the controller 130 may control all of a plurality of receivers 123_1 to 123_*n* of each of all the plurality of reception modules 120_1 to 120_*n* to receive the reflected wave RW from the target 200 at the same time. Alternatively, when sequentially operating the plurality of transmission modules 110_1 to 110_*n*, the controller 130 may control some of the plurality of receivers 123_1 to 123_*n* of each of all the plurality of reception modules 120_1 to 120_*n* to receive the reflected wave RW from the target 200 at the same time. Alternatively, when sequentially operating the plurality of transmission modules 110_1 to 110_*n*, the controller 130 may control all the plurality of receivers 123_1 to 123_*n* of each of some of the plurality of reception modules 120_1 to 120_*n* to receive the reflected wave RW from the target 200 at the same time. Alternatively, when sequentially operating the plurality of transmission modules 110_1 to 110_*n*, the controller 130 may control some of the plurality of receivers 123_1 to 123_*n* of each of some of the plurality of reception modules 120_1 to 120_*n* to receive the reflected wave RW from the target 200 at the same time.

The controller 130 may receive a digital signal into which the receive signal RS is converted from the plurality of reception modules 120_1 to 120_*n*. The reception controller 121 may include an analog-to-digital converter (ADC) for digital conversion. The controller 130 may perform a signal processing operation for the digital signal. The controller 130 may generate an image by means of the signal processing operation. The controller 130 may obtain an image of the target 200 (or a detection target) by means of signal processing from the digital signal. The controller 130 may perform the signal processing operation to convert the digital signal into the image. For example, the signal processing operation may include a Fourier transform operation.

The controller 130 may apply a different filter in performing the signal processing operation. The controller 130 may apply a filter having a different frequency response for each location of the reception module. For example, the controller 130 may apply a filter having a different frequency response based on the location of the reception module corresponding to the digital signal.

Figure 3:
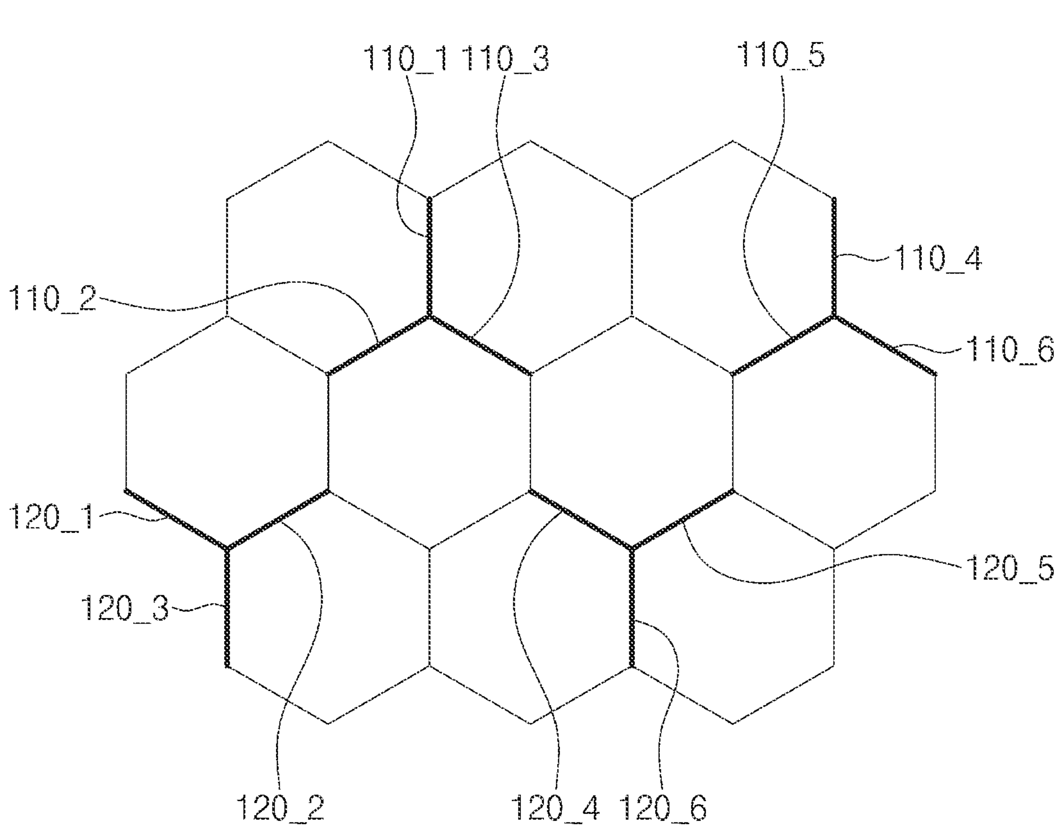
FIG. 3 is a drawing illustrating an example of a radar apparatus of FIG. 1.
Figure 3:
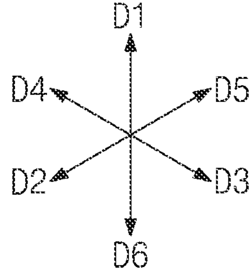

For example, the controller 130 may receive a first digital signal from the first reception module 120_1 and may receive a second digital signal from the second reception module 120_2. In performing the signal processing operation for the first digital signal, the controller 130 may apply a first filter having a first frequency response. In performing the signal processing operation for the second digital signal, the controller 130 may apply a second filter having a second frequency response. FIG. 3 is a drawing illustrating an example of a radar apparatus of FIG. 1. Referring to FIGS. 1 and 3, a radar apparatus 100 may include a plurality of transmission modules 110_1 to 110_6 and a plurality of reception modules 120_1 to 120_6. Each of the transmission modules 110_1 to 110_6 may be in a linear form. Each of the reception modules 120_1 to 120_6 may be in a linear form.

The plurality of transmission modules 110_1 to 110_6 may be arranged on a transmission and reception surface of the radar apparatus 100. The plurality of reception modules 120_1 to 120_6 may be arranged on the transmission and reception surface of the radar apparatus 100.

The plurality of transmission modules 110_1 to 110_6 may be arranged on lines of any polygon. The plurality of reception modules 120_1 to 120_6 may be arranged on lines of any polygon. For example, the polygon may be a triangle, a square, a hexagon, or the like. However, the scope of the present disclosure is not limited thereto. The polygon may be of various shapes depending on an implementation.

In an embodiment, the plurality of transmission modules 110_1 to 110_6 may be arranged on some or all lines (or edges) of the polygon. The plurality of reception modules 120_1 to 120_6 may be arranged on some or all lines (or edges) of the polygon. Alternatively, the plurality of transmission modules 110_1 to 110_6 may be arranged on some or all surfaces of the polygon. The plurality of reception modules 120_1 to 120_6 may be arranged on some or all surfaces of the polygon.

In an embodiment, the radar apparatus 100 may include the transmission and reception surface. The transmission and reception surface of the radar apparatus 100 may be of a configuration or structure where the polygons are repeatedly arranged. The transmission and reception surface of the radar apparatus 100 may have a structure where the polygons are repeatedly arranged. In other words, the radar apparatus 100 may be a combination of polygonal transmission and reception surfaces. For example, the transmission and reception surface may indicate one portion of a radar apparatus capable of detecting the target 200. The plurality of transmission modules 110_1 to 110_6 may be arranged on lines (or edges) of at least one of a plurality of polygons of the transmission and reception surface. The plurality of reception modules 120_1 to 120_6 may be arranged on lines of at least one of the plurality of polygons of the transmission and reception surface.

In an embodiment, polygons having edges where the plurality of transmission modules 110_1 to 110_6 and the plurality of reception modules 120_1 to 120_6 are arranged may be hexagons. The plurality of transmission modules 110_1 to 110_6 may be arranged on lines of hexagons. The plurality of reception modules 120_1 to 120_6 may be arranged on lines of hexagons.

In an embodiment, the plurality of transmission modules 110_1 to 110_6 may be arranged on boundary surfaces where two hexagonal shapes interlock with each other. The plurality of reception modules 120_1 to 120_6 may be arranged on boundary surfaces where two hexagonal shapes interlock with each other. Alternatively, the plurality of transmission modules 110_1 to 110_6 may be arranged on lines of a honeycomb structure. The plurality of reception modules 120_1 to 120_6 may be arranged on lines of the honeycomb structure. The honeycomb structure may be formed in a form where a plurality of hexagonal shapes interlock with each other.

The transmission and reception surface may have a structure where a plurality of hexagons are repeatedly arranged. A plurality of Y-shaped patterns or a plurality of Y-shaped edges may be formed or configured according to boundary surfaces where the plurality of polygonal shapes of the transmission and reception surface interlock with each other (or are adjacent to each other). As shown in FIG. 3, the transmission modules 110_1 to 110_3 may be arranged on a first Y-shaped edge, the transmission modules 110_4 to 110_6 may be arranged on a second Y-shaped edge, the reception modules 120_1 to 120_3 may be arranged on a third Y-shaped edge, and the reception modules 120_4 to 120_6 may be arranged on a fourth Y-shaped edge.

In a structure where a plurality of polygons (e.g., hexagons) are repeatedly arranged on the plane, the plurality of transmission modules 110_1 to 110_6 may be arranged in a pattern. In the structure where the plurality of polygons (e.g., hexagons) are repeatedly arranged on the plane, the plurality of transmission modules 110_1 to 110_6 and the plurality of reception modules 120_1 to 120_6 may be arranged in a pattern. For example, the pattern may be a Y-shaped pattern disposed on lines of a hexagon.

For example, one end of the first transmission module 110_1, one end of the second transmission module 110_2, and one end of the third transmission module 110_3 may be adjacent to each other. The first transmission module 110_1 may face a first direction D1, the second transmission module 110_2 may face a second direction D2, and the third transmission module 110_3 may face a third direction D3. One end of the fourth transmission module 110_4, one end of the fifth transmission module 110_5, and one end of the sixth transmission module 110_6 may be adjacent to each other. The fourth transmission module 110_4 may face the first direction D1, the fifth transmission module 110_5 may face the second direction D2, and the sixth transmission module 110_6 may face the third direction D3.

One end of the first reception module 120_1, one end of the second reception module 120_2, and one end of the third reception module 120_3 may be adjacent to each other. The first reception module 120_1 may face a fourth direction D4, the second reception module 120_2 may face a fifth direction D5, and the third reception module 120_3 may face a sixth direction D6. One end of the fourth reception module 120_4, one end of the fifth reception module 120_5, and one end of the sixth reception module 120_6 may be adjacent to each other. The fourth reception module 120_4 may face the fourth direction D4, the fifth reception module 120_5 may face the fifth direction D5, and the sixth reception module 120_6 may face the sixth direction D6.

In the structure where the plurality of polygons (e.g., squares) are repeatedly arranged on the plane, the plurality of transmission modules 110_1 to 110_6 and the plurality of reception modules 120_1 to 120_6 may be arranged in a pattern. In the structure where the plurality of polygons (e.g., squares) are repeatedly arranged on the plane, the plurality of transmission modules 110_1 to 110_6 and the plurality of reception modules 120_1 to 120_6 may be arranged in a pattern. For example, the pattern may be an L-shaped pattern or rotated pattern of the same disposed on lines of the square. For example, the transmission modules 110_1 to 110_6 may have the L-shaped pattern, and the reception modules 120_1 to 120_6 may have the rotated pattern of the L-shaped pattern. Alternatively, the transmission modules 110_1 to 110_6 may have the L-shaped pattern, and the reception modules 120_1 to 120_6 may have the L-shaped pattern. However, the scope of the present disclosure is not limited thereto. Each of the pattern of the transmission modules and the pattern of the reception modules may be varied according to an implementation manner.

Illustratively, in the embodiment of FIG. 3, it is illustrated that the six transmission modules and the six reception modules are arranged in the Y-shaped pattern in a hexagonal honeycomb structure, but the scope of the present disclosure is not limited thereto. The number of transmission modules, the number of reception modules, a type of a polygon, a pattern, or the like may be varied according to an implementation manner.

Figure 4:
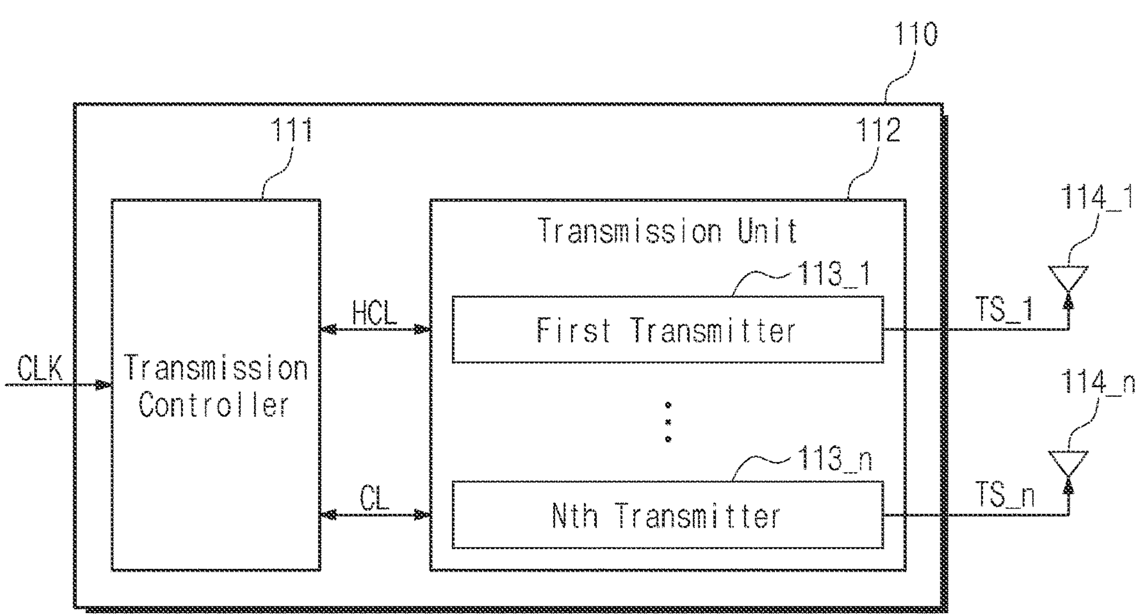
FIG. 4 is a block diagram illustrating an example of a transmission module of FIG. 2.

FIG. 4 is a block diagram illustrating an example of a transmission module of FIG. 2. Referring to FIGS. 2 and 4, a transmission module 110 may include a transmission controller 111, a plurality of transmitters 113_1 to **113_*n* and a plurality of transmit antennas 114_1 to 114_*n*. A transmission unit 112 may include the first to nth transmitters 113_1 to 113_*n*. The plurality of transmitters 113_1 to 113_*n* may be connected with the plurality of transmit antennas 114_1 to 114_*n*, respectively. For example, the first transmitter 113_1 may be connected with the first transmit antenna 114_1, and the second transmitter 113_2 may be connected with the second transmit antenna 114_2. Because the remaining transmitters 113_3 to 113_*n*** are similar to those described above, a detailed description thereof will be omitted.

The transmission controller 111 may control the overall operation of the transmission module 110. The transmission controller 111 may manage (or control) the plurality of transmitters 113_1 to **113_*n* by means of control signals. The transmission controller 111 may generate a control signal necessary to generate transmit signals TS_1 to TS_n of the plurality of transmitters 113_1 to 113_*n***. The control signal may be an analog signal (or an analog voltage) or a digital signal (or digital bits).

The transmission controller 111 may communicate with a controller 130. The transmission controller 111 may transmit and receive data or a signal with the controller 130. The transmission controller 111 may interface with the controller 130. The transmission controller 111 may receive a reference clock signal CLK from the controller 130. The transmission controller 111 may generate a reference frequency signal RF used for the transmission unit 112 to generate the transmit signals TS_1 to TS_n, based on the reference clock signal CLK.

The transmission controller 111 may include a phase-locked loop (PLL). The controller 111 may generate the reference frequency signal RF. The transmission controller 111 may control the reference frequency signal RF using the PLL. For example, the transmission controller 111 may control a center frequency, power, modulation, or the like of the reference frequency signal RF. The transmission controller 111 may output the reference frequency signal RF to the transmission unit 112. For example, the transmission controller 111 may distribute and deliver the same reference frequency signal RF to the plurality of transmitters 113_1 to **113_*n* of the transmission unit 112**.

The transmission controller 111 may generate a control signal. The control signal may be a signal necessary for the plurality of transmitters 113_1 to **113_*n* to the transmit signals TS_1 to TS_n, respectively. The transmission controller 111 may control a center frequency, transmit power, modulation, or the like of each of the plurality of transmitters 113_1 to 113_*n*** by means of the control signal. For example, the control signal may include an output control signal PC, a modulation signal MD, or the like.

The transmission controller 111 may generate the modulation signal MD. The transmission controller 111 may generate the modulation signal MD based on the reference frequency signal RF. For example, the transmission controller 111 may control a frequency and a phase of the reference frequency signal RF to generate the modulation signal MD. The transmission controller 111 may output the modulation signal MD to the transmission unit 112.

The transmission controller 111 may generate the output control signal PC. The output control signal PC may be a signal for controlling output powers of the plurality of transmitters 113_1 to 113__n_ of the transmission unit 112. The transmission controller 111 may output the output control signal PC to the transmission unit 112. The transmission controller 111 may control powers of the plurality of transmitters 113_1 to 113__n_ by means of the output control signal PC at the same time. Alternatively, the transmission controller 111 may independently control powers of the plurality of transmitters 113_1 to 113__n_ by means of the output control signal PC. For example, the transmission controller 111 may control the first transmitter 113_1 to have a first output power by means of the output control signal PC and may control the first transmitter 113_1 to have a second output power by means of the output control signal PC. The first output power and the second output power may be different from each other.

As an embodiment of the transmission module 110, the plurality of transmitters 113_1 to 113__n_ may include a PLL and an oscillator. In this case, the transmission controller 111 may deliver the reference clock signal CLK to the plurality of transmitters 113_1 to 113__n_ and may apply a signal for controlling a center frequency and an output of each of the transmit signals TS_1 to TS_n to the plurality of transmitters 113_1 to 113__n_.

The transmission controller 111 may selectively activate the plurality of transmitters 113_1 to 113__n_. For example, the transmission controller 111 may activate all the plurality of transmitters 113_1 to 113__n_. Alternatively, the transmission controller 111 may activate some of the plurality of transmitters 113_1 to 113__n_. In other words, the transmission controller 111 may operate only some of the plurality of transmitters 113_1 to 113__n_ by means of an active signal. For example, the transmission controller 111 may set second and third active signals to an active state (e.g., a logic high) and may set a first active signal to an inactive state (e.g., a logic low) to maintain the first transmitter 113_1 in the inactive state (i.e., may not operate the first transmitter 113_1) and may operate only the second transmitter 113_2 and the third transmitter 120_3. In other words, the first transmit antenna 114_1 may not be activated, and only the second transmit antenna 114_2 and the third transmit antenna 114_3 may be activated.

The transmission controller 111 may sequentially operate the plurality of transmitters 113_1 to 113__n_. The transmission controller 111 may activate the plurality of transmitters 113_1 to 113__n_, based on an activation order of the plurality of transmitters 113_1 to 113__n_. For example, the activation order is to activate the first transmitter 113_1, then activate the second transmitter 113_2, and then activate the third transmitter 113_3. In this case, the transmission controller 111 may operate the first transmitter 113_1, may then operate the second transmitter 113_2, and may then operate the third transmitter 113_3. Thus, the transmit antennas 114_1 to 114__n_ may be activated in the activation order. For example, the first transmit antenna 114_1 may be activated, the second transmit antenna 114_2 may then be activated, and the third transmit antenna 114_3 may then be activated.

The transmission controller 111 may change the activation order of the plurality of transmitters 113_1 to 113__n_. For example, the transmission controller 111 may variably change the activation order of the plurality of transmitters 113_1 to 113__n_ based on a reflected wave RW (refer to FIG. 1) from a target 200 (refer to FIG. 1). In other words, the activation order may be variable according to a response of the reflected wave RW. The transmission controller 111 may adjust the activation order of the plurality of transmitters 113_1 to 113__n_ under control of a controller 130. For example, the transmission controller 111 may change the activation order (e.g., an order of the first transmitter 113_1, the second transmitter 113_2, and the third transmitter 113_3). The changed activation order is to activate the third transmitter 113_3, then activate the second transmitter 113_2, and then activate the first transmitter 113_1. In this case, the transmission controller 111 may operate the third transmitter 113_3, may then operate the second transmitter 113_2, and may then operate the first transmitter 113_1. Thus, the transmit antennas 114_1 to 114__n_ may be activated in the activation order. For example, the third transmit antenna 114_3 may be activated, the second transmit antenna 114_2 may then be activated, and the first transmit antenna 114_1 may then be activated.

In an embodiment, the activation order may be predetermined. In detail, the activation order may be set to obtain a high-resolution image. The activation order may be fixed or varied by a designer, a manufacturer, and/or a user. For example, the activation order may be varied by means of the controller 130.

The transmission controller 111 and the transmission unit 112 may be connected with each other through a control line CL and a high-frequency control line HCL. The transmission controller 111 may transmit control signals through the control line CL. For example, the transmission controller 111 may transmit the output control signal PC, the modulation signal MD, an active signal, or the like through the control line CL. The transmission controller 111 may transmit the reference frequency signal RF through the high-frequency control line HCL.

The transmission unit 112 may receive the control signal, the reference frequency signal RF, or the like from the transmission controller 111. The control signal may include the output control signal PC, the modulation signal MD, the active signal, or the like. The transmission unit 112 may generate a transmit signal TS based on the signals provided from the transmission controller 111. For example, the transmission unit 112 may generate the transmit signal TS based on the control signal or the reference frequency signal RF.

The transmission unit 112 may receive the reference frequency signal RF from transmit the transmission controller 111. The transmission unit 112 may generate the transmit signal TS based on the reference frequency signal RF. The first to nth transmitters 113_1 to 113__n_ may receive the reference frequency signal RF from the transmission controller 111. The first to nth transmitters 113_1 to 113__n_ may generate transmit signals TS_1 to TS_n, each of which has a transmit frequency, respectively, based on the reference frequency signal RF. For example, the first transmitter 113_1 may generate the first transmit signal TS_1 based on the reference frequency signal RF, and the second transmitter 113_2 may generate the second transmit signal TS_2 based on the reference frequency signal RF. Because the remaining transmitters 113_3 to 113__n_ are similar to those described above, a detailed description thereof will be omitted.

The transmit signal TS may be an integer multiple of the reference frequency signal RF. The frequency of the transmit signal TS may be an integer multiple of the frequency of the reference frequency signal RF. For example, it is assumed that the reference frequency signal RF is 17.5 GHz. The transmit signal TS may be 8 times the reference frequency signal RF, 140 GHz.

Each of the plurality of transmit signals TS_1 to TS_n may be an integer multiple of the reference frequency signal RF. For example, the first transmit signal TS_1 may be an integer multiple of the reference frequency signal RF, and the second transmit signal TS_2 may be an integer multiple of the reference frequency signal RF. Because the remaining transmit signals TS_3 to TS_n are similar to those described above, a detailed description thereof will be omitted.

Each of the plurality of transmitters 113_1 to 113_*n* may receive the output control signal PC. Each of the plurality of transmitters 113_1 to 113_*n* may adjust output power based on the output control signal PC. For example, the first transmitter 113_1 may adjust a first output power based on the output control signal PC, and the second transmitter 113_2 may adjust a second output power based on the output control signal PC. The first output power may indicate an output power of the first transmitter 113_1, and the second output power may indicate an output power of the second transmitter 113_2. Because the remaining transmitters 113_3 to 113_*n* are similar to those described above, a detailed description thereof will be omitted.

Each of the plurality of transmitters 113_1 to 113_*n* may receive the active signal. Each of the plurality of transmitters 113_1 to 113_*n* may be activated based on the active signal. In other words, each of the plurality of transmitters 113_1 to 113_*n* may be activated to output the transmit signal TS. For example, when the first transmitter 113_1 is activated, it may activate the first transmit antenna 114_1 and may output the first transmit signal TS_1 to the first transmit antenna 114_1.

The plurality of transmitters 113_1 to 113_*n* may output the plurality of transmit signals TS_1 to TS_n to the plurality of transmit antennas 114_1 to 114_*n*, respectively. For example, the first transmitter 113_1 may output the first transmit signal TS_1 to the first transmit antenna 114_1, and the second transmitter 113_2 may output the second transmit signal TS_2 to the second transmit antenna 114_2. Because the remaining transmitters 113_3 to 113_*n* are similar to those described above, a detailed description thereof will be omitted.

The plurality of transmit antennas 114_1 to 114_*n* may receive the plurality of transmit signals TS_1 to TS_n from the plurality of transmitters 113_1 to 113_*n*, respectively. For example, the first transmit antenna 114_1 may receive the first transmit signal TS_1 from the first transmitter 113_1, and the second transmit antenna 114_2 may receive the second transmit signal TS_2 from the second transmitter 113_2. Because the remaining transmitters 113_3 to 113_*n* are similar to those described above, a detailed description thereof will be omitted.

Each of the plurality of transmit antennas 114_1 to 114_*n* may radiate a transmission wave TW (refer to FIG. 1) to the target 200 based on a corresponding one of the plurality of transmit signals TS_1 to TS_n. For example, the first transmit antenna 114_1 may radiate the transmission wave TW to the target 200 based on the first transmit signal TS_1. The transmission wave TW may be a wireless signal. The characteristic of the transmission wave TW may be determined based on the transmit signal TS.

The implementation of the transmission unit 112 and the transmission controller 111 may be integrated using an integrated circuit technology. In other words, the transmission unit 112 and the transmission controller 111 may be implemented as an integrated circuit chip. In detail, the transmission unit 112 may be implemented as a transmission chip where the plurality of transmitters 113_1 to 113_*n* are integrated. A radar apparatus 100 according to an embodiment of the present disclosure may be easily implemented using a CMOS technology or the like and may be advantageous for integration.

Figure 5:
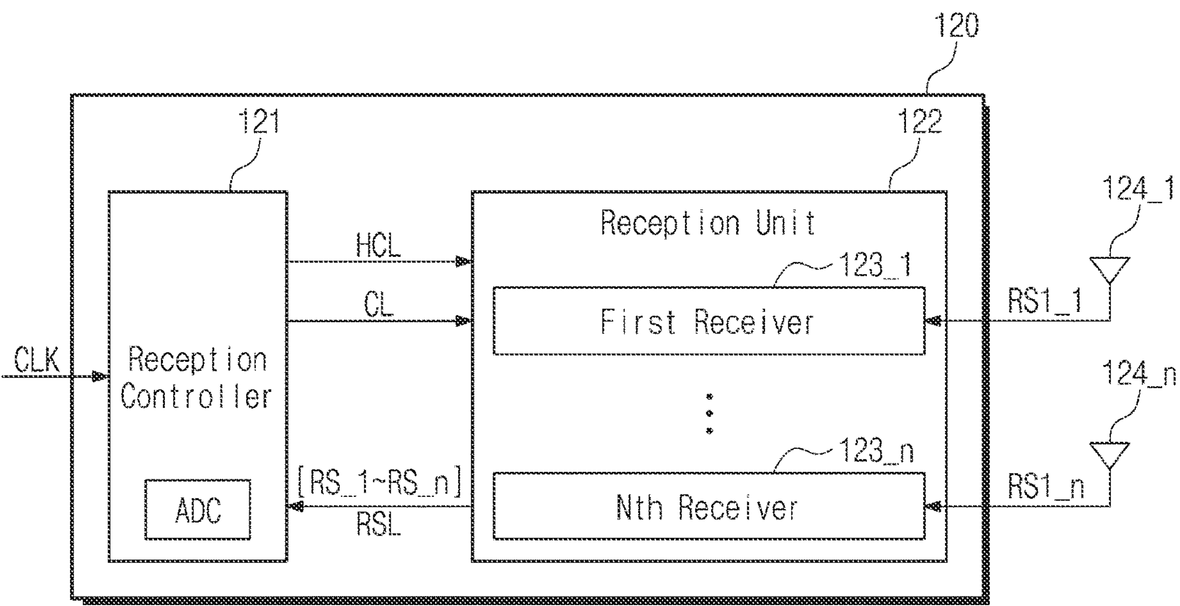
FIG. 5 is a block diagram illustrating an example of a reception module FIG. 2.

FIG. 5 is a block diagram illustrating an example of a reception module FIG. 2. Referring to FIGS. 2 and 5, a reception module 120 may include a reception controller 121, first to nth receivers 123_1 to 123_*n*, and first to nth receive antennas 124_1 to 124_*n*. A reception unit 122 may include the first to nth receivers 123_1 to 123_*n*. The plurality of receivers 123_1 to 123_*n* may be connected with the plurality receive antennas 124_1 to 124_*n*, respectively. For example, the first receiver 123_1 may be connected with the first receive antenna 124_1, and the second receiver 123_2 may be connected with the second receive antenna 124_2. Because the remaining receivers 123_3 to 123_*n* are similar to those described above, a detailed description thereof will be omitted.

Each of the plurality of receive antennas 124_1 to 124_*n* may receive a reflected wave RW (refer to FIG. 1) corresponding to a transmission wave TW (refer to FIG. 1). The plurality of receive antennas 124_1 to 124_*n* may deliver signals RS1_1 to RS1_*n* (RS1) generated based on the reflected wave RW to the plurality of receivers 123_1 to 123_*n*, in response to the reflected wave RW, respectively. The signal RS1 generated based on the reflected wave RW may be associated with a characteristic of the reflected wave RW. For example, the first receive antenna 124_1 may output the signal RS1_1 generated based on the reflected wave RW to the first receiver 123_1, and the second receive antenna 124_2 may output the signal RS1_2 generated based on the reflected wave RW to the second receiver 123_2. Because the remaining receive antennas 124_3 to 124_*n* are similar to those described above, a detailed description thereof will be omitted.

The plurality of receivers 123_1 to 123_*n* may receive the signals RS1_1 to RS1_*n* generated based on the reflected wave RW from the plurality of receive antennas 124_1 to 124_*n*, respectively. Each of the plurality of receivers 123_1 to 123_*n* may receive a control signal, a local signal LO, or the like from the reception controller 121. The control signal may include a modulation signal MD, a sensitivity adjustment signal GSC, an active signal, or the like. The plurality of receivers 123_1 to 123_*n* may convert the signals RS1_1 to RS1_*n* generated based on the reflected wave RW into the receive signals RS_1 to RS_n, respectively, based on the control signal or the local signal LO. For example, the first receiver 123_1 may generate the first receive signal RS_1 based on the signal RS1_1 generated based on the control signal, the local signal LO, and the reflected wave RW. The second receiver 123_2 may generate the second receive signal RS_2 based on the signal RS1_2 generated based on the control signal, the local signal LO, and the reflected wave RW. Each of the plurality of receivers 123_1 to 123_*n* may output each of the generated receive signals RS_1 to RS_n to the reception controller 121.

Each of the plurality of receivers 123_1 to 123_*n* may receive the active signal. Each of the plurality of receivers 123_1 to 123_*n* may be activated based on the active signal. In other words, each of the plurality of receivers 123_1 to 123_*n* may be activated to output a receive signal RS to the reception controller 121. For example, when the first receiver 123_1 is activated, the first receive antenna 124_1 may be activated to receive the reflected wave RW and output the signal RS1_1 generated based on the reflected wave RW to the first receiver 123_1, and the first receiver 123_1 may generate a first receive signal RS_1 based on the signal RS1_1 generated based on the reflected wave RW and may output the first receive signal RS_1 to the reception controller 121.

The reception controller 121 may control the overall operation of the reception module 120. The reception controller 121 may manage (or control) the plurality of receivers 123_1 to 123_*n* by means of control signals. The reception controller 121 may generate a control signal necessary for an operation of each of the plurality of receivers 123_1 to 123_*n*. The control signal may be an analog signal (or an analog voltage) or a digital signal (or digital bits).

The reception controller 121 may communicate with a controller 130. The reception controller 121 may transmit and receive data or a signal with the controller 130. The reception controller 121 may interface with the controller 130.

The reception controller 121 may receive a reference clock signal CLK from the controller 130. The reception controller 121 may generate a local signal LO based on the reference clock signal CLK. For example, the local signal LO may be a signal necessary for an operation of each of the plurality of receivers 123_1 to 123_*n* of the reception unit 122. Alternatively, the local signal LO may be a signal for controlling each of the plurality of receivers 123_1 to 123_*n* of the reception unit 122. The reception controller 121 may output the local signal LO to the reception unit 122.

The reception controller 121 may include a phase-locked loop (PLL). The reception controller 121 may generate the local signal LO. The reception controller 121 may control the local signal LO using the PLL. For example, the local signal LO may have the same frequency as the reference frequency signal RF of a transmission module 110 (refer to FIG. 4). Furthermore, the local signal LO may be a signal having an offset in the reference frequency signal RF of the transmission module 110.

The reception controller 121 may control a center frequency, power, or the like of the local signal LO. The reception controller 121 may output the local signal LO to the reception unit 122. For example, the reception controller 121 may distribute and deliver the same local signal LO to the plurality of receiver 123_1 to 123_*n* of the reception unit 122.

The reception controller 121 may generate a control signal. The control signal may be a signal necessary for an operation of each of the plurality of receivers 123_1 to 123_*n*. The reception controller 121 may control a center frequency, power, modulation, or the like of each of the plurality of receivers 123_1 to 123_*n* by means of the control signal. The reception controller 121 may control a gain, sensitivity, and the like of each of the plurality of receivers 123_1 to 123_*n* by means of the control signal. For example, the control signal may include a modulation signal MD, a sensitivity adjustment signal GSC, or the like.

The reception controller 121 may generate the modulation signal MD. The reception controller 121 may generate the modulation signal MD based on the local signal LO. For example, the reception controller 121 may control a frequency and a phase of the local signal LO to generate the modulation signal MD. The reception controller 121 may output the modulation signal MD to the reception unit 122.

The reception controller 121 may generate the sensitivity adjustment signal GSC. The sensitivity adjustment signal GSC may indicate a signal for adjusting a gain and sensitivity of each of the plurality of receivers 123_1 to 123_*n*. The reception controller 121 may output the sensitivity adjustment signal GSC to the reception unit 122.

The reception controller 121 may selectively activate the plurality of receivers 123_1 to 123_*n*. For example, the reception controller 121 may activate all the plurality of receivers 123_1 to 123_*n*. Alternatively, the reception controller 121 may activate some of the plurality of receivers 123_1 to 123_*n*. The reception controller 121 may operate only some of the plurality of receivers 123_1 to 123_*n* by means of the active signal. For example, the reception controller 121 may set second and third active signals to an active state (e.g., a logic high) and may set a first active signal to an inactive state (e.g., a logic low) to maintain the first receiver 123_1 in the inactive state (i.e., may not operate the first receiver 123_1) and may operate only the second receiver 123_2 and the third receiver 120_3. In other words, the first receive antenna 124_1 may not be activated, and only the second receive antenna 124_2 and the third receive antenna 124_3 may be activated.

The reception controller 121 may receive signals RS_1 to RS_n (RS) from the plurality of receivers 123_1 to 123_*n*. For example, the reception controller 121 may receive the first receive signal RS_1 from the first receiver 123_1 and may receive the second receive signal RS_2 from the second receiver 123_2. Because the remaining receive signals RS_3 to RS_n are similar to those described above, a detailed description thereof will be omitted.

The reception controller 121 may include an analog-to-digital converter (ADC). The ADC may convert each of the plurality of receive signals RS_1 to RS_n into a digital value (e.g., a conversion value). The ADC may convert each of the plurality of receive signals RS_1 to RS_n into a digital signal. The ADC may include a selection unit and a conversion unit. The selection unit may select one of the plurality of receive signals. The conversion unit may convert the receive signal selected by the selection unit into a digital signal. Alternatively, the ADC may be implemented without the selection unit using a converting unit converting each of the receive signals RS_1 to RS_n.

For example, the selection unit of the ADC may select the first receive signal RS_1, and the conversion unit of the ADC may convert the first receive signal RS_1 into a first digital signal. The selection unit of the ADC may select the second receive signal RS_2, and the conversion unit of the ADC may convert the second receive signal RS_2 into a second digital signal. Because the remaining receive signals RS_3 to RS_n are similar to those described above, a detailed description thereof will be omitted. The reception controller 121 may deliver the digital signal to a controller 130.

The reception controller 121 and the reception unit 122 may be connected with each other through a control line CL and a high-frequency control line HCL. The reception controller 121 may transmit control signals through the control line CL. For example, the reception controller 121 may transmit the modulation signal MD, the sensitivity adjustment signal GSC, the active signal, or the like through the control line CL. The reception controller 121 may transmit the local signal LO through the high-frequency control line HCL. The reception controller 121 may receive the receive signals RS_1 to RS_n (RS) through a receive signal line RSL.

The implementation of the reception unit 122 and the reception controller 121 may be integrated using an integrated circuit technology. In other words, the reception unit 122 and the reception controller 121 may be implemented as an integrated circuit chip. For example, the reception controller 121 may include a local generation circuit unit for generating a local signal, a control generation circuit unit for generating a control signal, an ADC, and the like. The local generation circuit unit, the control generation circuit unit, and the ADC may be implemented as a single integrated circuit chip. A radar apparatus 100 according to an embodiment of the present disclosure may be easily implemented using a CMOS technology or the like and may be advantageous for integration.

Figure 6:
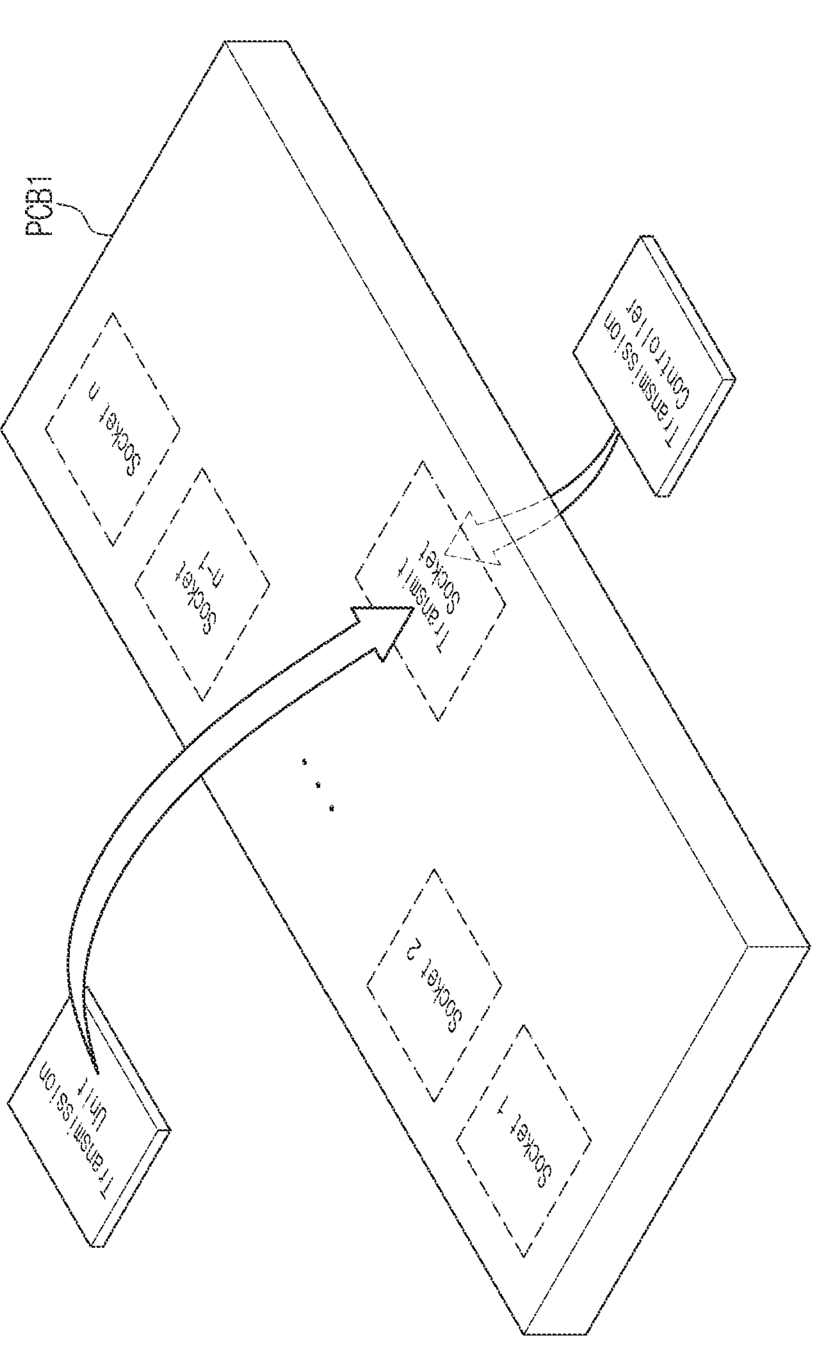
FIG. 6 is a drawing illustrating an example of a transmission module of FIG. 2.

FIG. 6 is a drawing illustrating an example of a transmission module of FIG. 2. For the simplicity of the drawing, a portion of the configuration of a transmission module is illustrated. However, the scope of the present disclosure is not limited thereto. A transmission module 110 (refer to FIG. 4) may further include other components.

Referring to FIG. 6, a transmission module 110 may include a first printed circuit board PCB1, a transmission controller, a transmission unit, and first to nth transmit antennas. The transmission controller may correspond to a transmission controller 111 of FIG. 4. The transmission unit may correspond to a transmission unit 112 of FIG. 4. The first to nth transmit antennas may correspond to transmit antennas 114_1 to 114_*n* of FIG. 4. Because the transmission controller, the transmission unit, and the first to nth transmit antennas are described above, a detailed description thereof will be omitted.

The first printed circuit board PCB1 may include a transmit socket, a controller socket, and first to nth sockets. The transmit socket may be an area, configuration, or device where the transmission unit 112 is mounted. The first to nth sockets may be an area, configuration, or device where the first to nth transmit antennas 114_1 to 114_*n* are mounted. Although not clearly illustrated in the drawing, an additional socket may be further formed on a bottom surface of the first printed circuit board PCB1. The controller socket may be formed on the bottom surface of the first printed circuit board PCB1. The controller socket may be an area, configuration, or device where the transmission controller 111 is mounted.

The transmission unit 112 may be mounted on the transmit socket. The transmission controller 111 may be mounted on the controller socket. The first to nth transmit antennas 114_1 to 114_*n* may be mounted on the first to nth sockets, respectively. The transmit socket and the first to nth sockets may be arranged in two rows on the first printed circuit board PCB1. The transmit socket may be located in a central area of a first row on a top surface of the first printed circuit board PCB1. The first to nth sockets may be located spaced apart from each other in a first direction in a second row on the top surface of the first printed circuit board PCB1.

Figure 7:
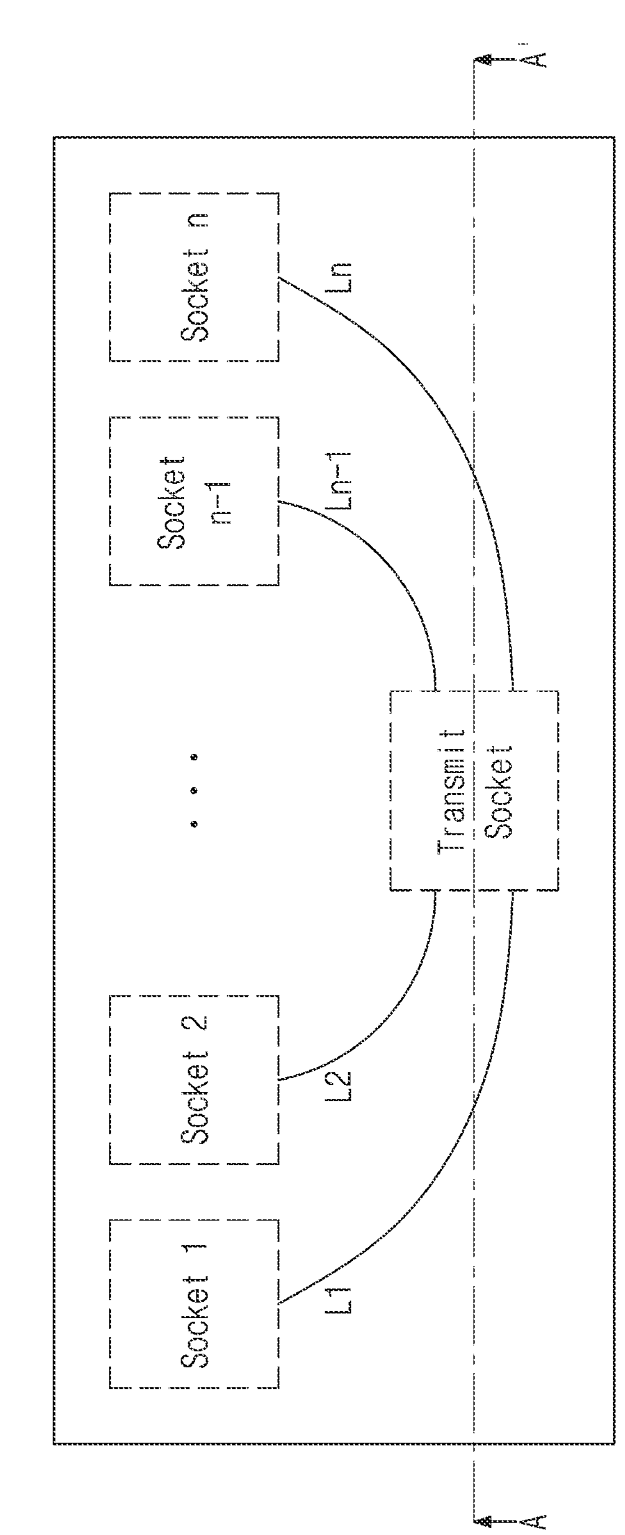
FIGS. 7, 8, and 9 are drawings illustrating an example of a first printed circuit board of FIG. 6.
Figure 8:
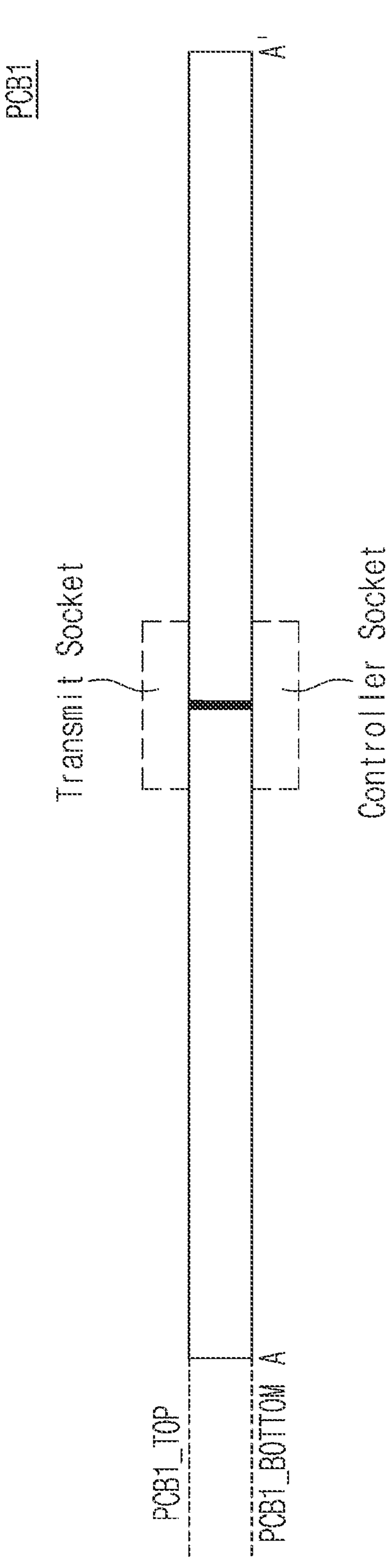
Figure 9:
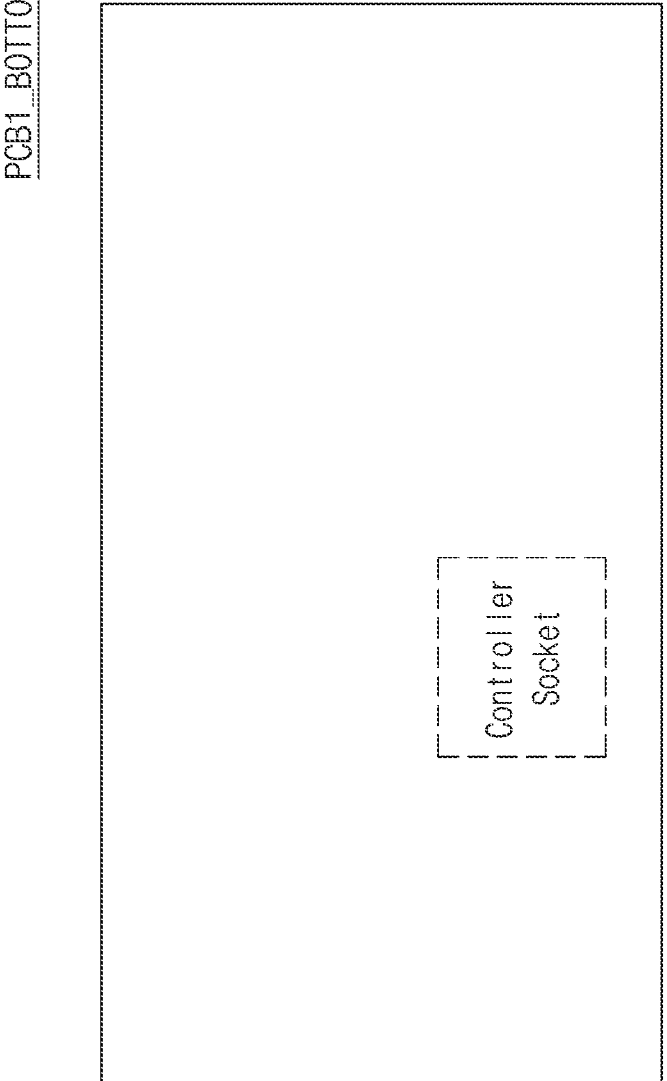

FIGS. 7 to 9 are drawings illustrating an example of a first printed circuit board of FIG. 6. The drawing illustrated in FIG. 7 is a plan view illustrating a top surface of a first printed circuit board PCB1. The drawing illustrated in FIG. 8 is an A-A' cross-sectional view of a first printed circuit board PCB1 illustrated in FIG. 7. The drawing illustrated in FIG. 9 is a plan view illustrating a bottom surface of a first printed circuit board PCB1.

First to nth sockets and a transmit socket may be formed on a top surface PCB1_TOP (or a transmission surface or a detection surface) of the first printed circuit board PCB1. A controller socket may be formed on a bottom surface PCB1_BOTTOM (or an opposite surface) of the first printed circuit board PCB1. For example, the controller socket may be disposed to face the transmit socket.

The first printed circuit board PCB1 may include signal lines (or transmission lines) L1 to Ln. The signal lines L1 to Ln may be a signal transmission path between a transmission unit 112 (refer to FIG. 4) and first to nth transmit antennas 114_1 to 114_*n* (refer to FIG. 4). in other words, the signal lines L1 to Ln may be configured to electrically connect between the first to nth sockets and the transmit socket. For example, the first signal line L1 may connect between socket 1 and the transmit socket, and the second signal line L2 may connect between socket 2 and the transmit socket.

The first printed circuit board PCB1 may include a via contact (or a via hole). The via hole may be a signal transmission path between the transmission unit 112 and a transmission controller 111 (refer to FIG. 4). In other words, the via contact may be configured to electrically connect the transmit socket with the controller socket. In other words, the transmit socket and the controller socket may be connected through the via contact. For example, a control signal generated by the transmission controller 111 or a reference frequency signal RF may be applied to the transmission unit 112 through the via contact.

The first to nth sockets may be formed at locations spaced apart from each other along a horizontal direction by a first distance. The horizontal direction may be a direction parallel to the top surface and the bottom surface of the first printed circuit board PCB1. For example, the horizontal direction may indicate a horizontal axis direction of a plane formed by the top surface of the first printed circuit board PCB1, a vertical axis direction of the plane, or a direction in which horizontal and vertical axes are combined.

Because the transmit antennas 114_1 to 114_*n* are mounted on the first to nth sockets, they may be formed along the horizontal direction. In other words, the transmit antennas 114_1 to 114_*n* may be linearly arranged on the top surface. The transmit antennas 114_1 to 114_*n* may be connected with the transmission unit 112 through each of the signal lines L1 to Ln. For example, the first transmit antenna 114_1 may be connected with the transmission unit 112 through the signal line L1, and the second transmit antenna 114_2 may be connected with the transmission unit 112 through the second signal line L2.

Figure 10:
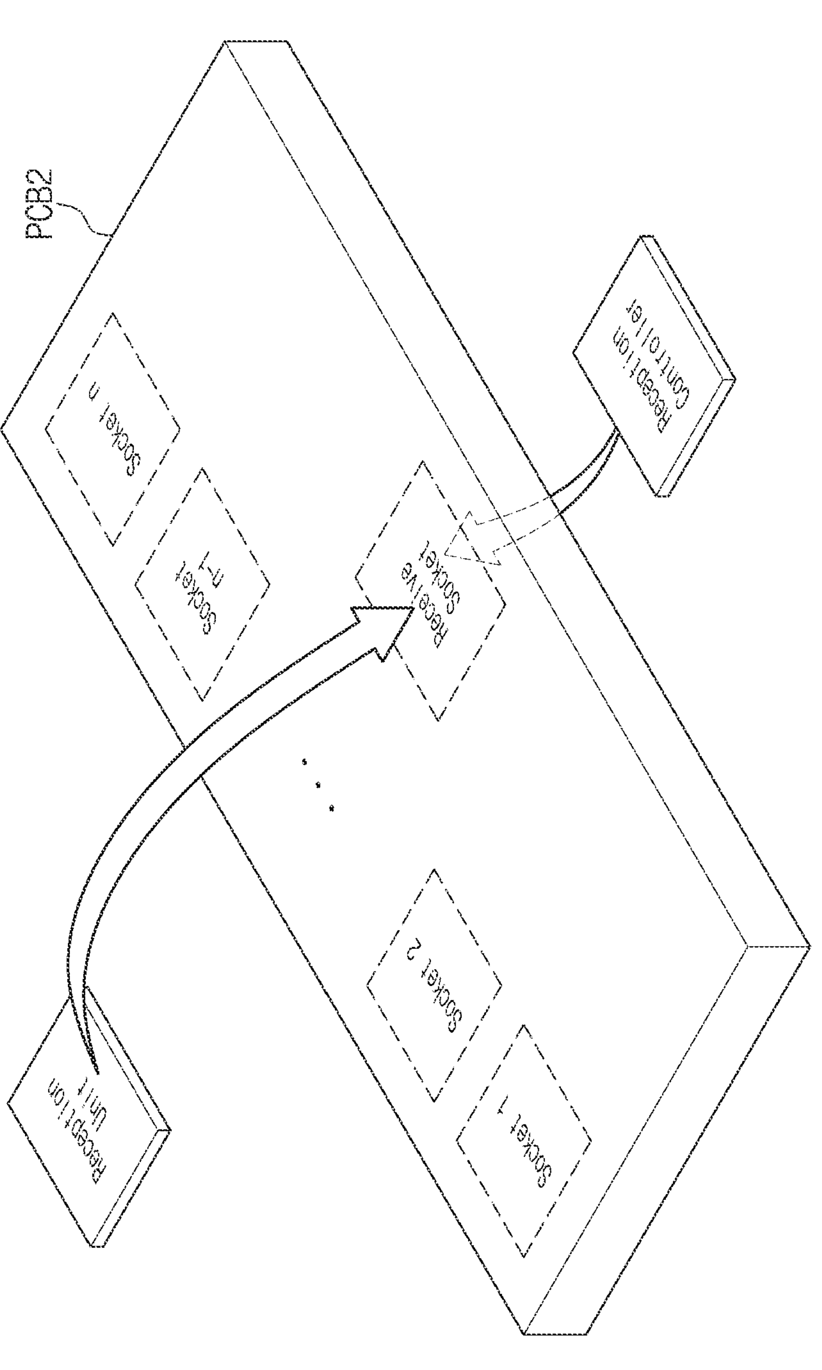
FIG. 10 is a drawing illustrating an example of a reception module of FIG. 2.

FIG. 10 is a drawing illustrating an example of a reception module of FIG. 2. For the simplicity of the drawing, a portion of the configuration of a reception module is illustrated. However, the scope of the present disclosure is not limited thereto. A reception module 120 (refer to FIG. 5) may further include other components.

Referring to FIG. 10, the reception module 120 may include a second printed circuit board PCB2, a reception controller, a reception unit, and first to nth receive antennas. The reception controller may correspond to a reception controller 121 of FIG. 5. The reception unit may correspond to a reception unit 122 of FIG. 5. The first to nth receive antennas may correspond to receive antennas 124_1 to 124_*n* of FIG. 5. Because the reception controller, the reception unit, and the first to nth receive antennas are described above, a detailed description thereof will be omitted.

The second printed circuit board PCB2 may include a receive socket, a controller socket, and first to nth sockets. The receive socket may be an area, configuration, or device where the reception unit 122 is mounted. The first to nth sockets may be an area, configuration, or device where the first to nth receive antennas 124_1 to 124_*n* are mounted. Although not clearly illustrated in the drawing, additional sockets may be further formed on a bottom surface of the second printed circuit board PCB2. The controller socket may be mounted on the additional sockets formed on the bottom surface of the second printed circuit board PCB2. The controller socket may be an area, configuration, or device where the reception controller 121 is mounted.

The reception unit 122 may be mounted on the receive socket. The reception controller 121 may be mounted on the controller socket. The first to nth receive antennas 124_1 to 124_n may be mounted on the first to nth sockets, respectively. The receive socket and the first to nth sockets may be arranged in two rows on the second printed circuit board PCB2. The receive socket may be located in a central area of a first row on a top surface of the second printed circuit board PCB2. The first to nth sockets may be located spaced apart from each other in a first direction in a second row on the top surface of the second printed circuit board PCB2.

Figure 11:
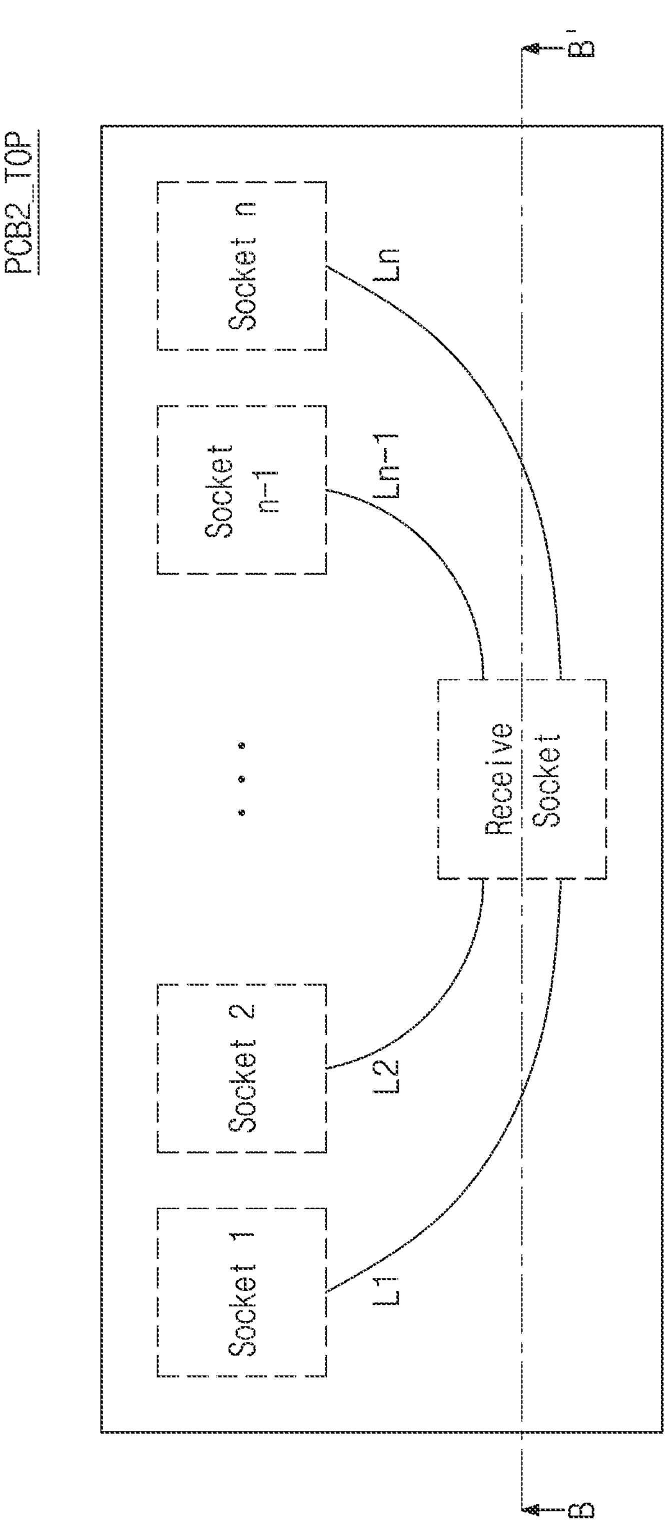
FIGS. 11, 12, and 13 are drawings illustrating an example of a second printed circuit board of FIG. 10.
Figure 12:
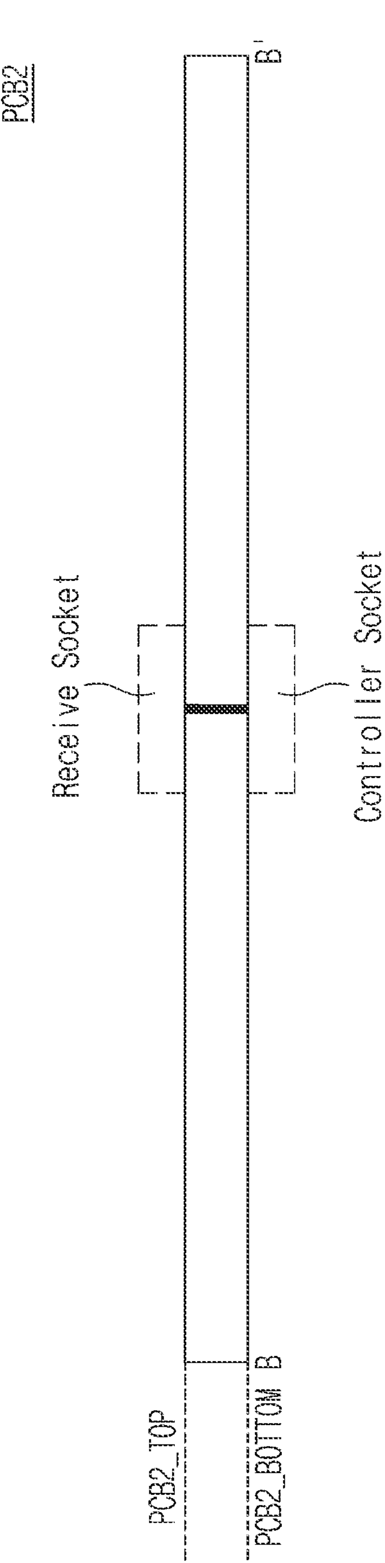
Figure 13:
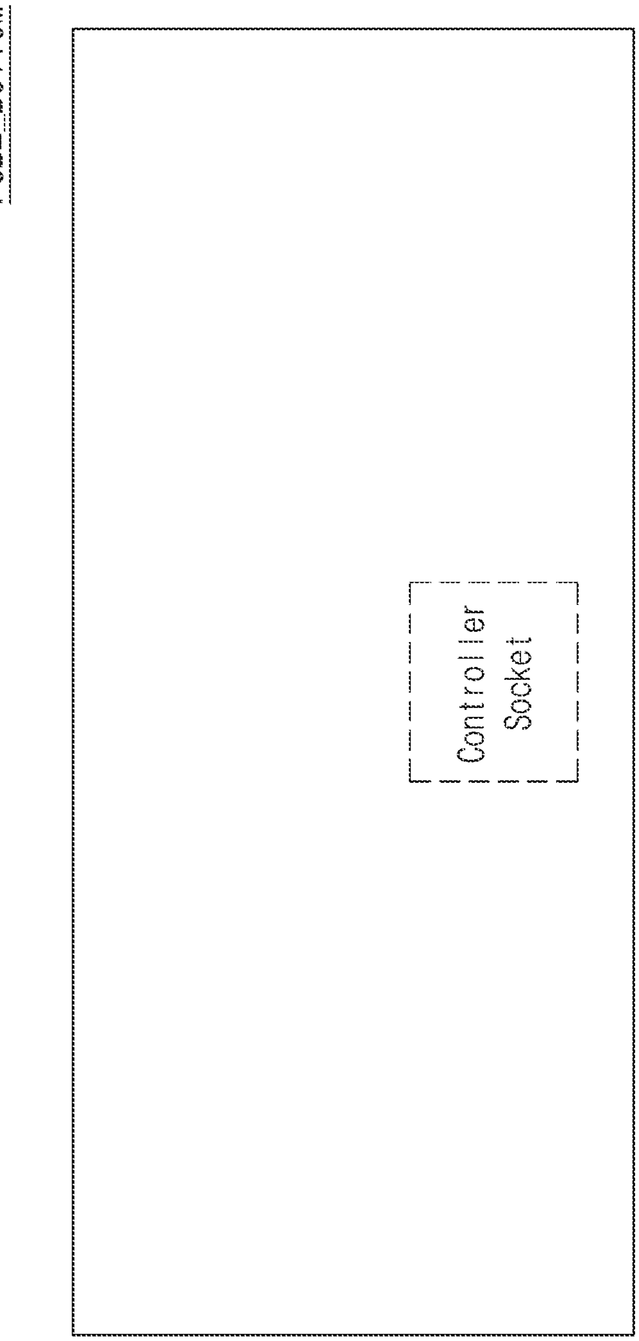

FIGS. 11 to 13 are drawings illustrating an example of a second printed circuit board of FIG. 10. The drawing illustrated in FIG. 11 is a plan view illustrating a top surface of a second printed circuit board PCB2. The drawing illustrated in FIG. 12 is a B-B' cross-sectional view of a second printed circuit board PCB2. The drawing illustrated in FIG. 13 is a plan view illustrating a bottom surface of a second printed circuit board PCB2.

First to nth sockets and a receive socket may be formed on a top surface PCB2_TOP (or a reception surface) of the second printed circuit board PCB2. A controller socket may be formed on a bottom surface PCB2_BOTTOM (or an opposite surface) of the second printed circuit board PCB2. For example, the controller socket may be disposed to face the receive socket.

The second printed circuit board PCB2 may include signal lines (or transmission lines) L1 to Ln. The signal lines L1 to Ln may be a signal transmission path between a reception unit 122 (refer to FIG. 5) and first to nth receive antennas 124_1 to 124_n (refer to FIG. 5). In other words, the signal lines L1 to Ln may be configured to electrically connect between the first to nth sockets and the receive socket. For example, the first signal line L1 may connect between socket 1 and the receive socket, and the second signal line L2 may connect between socket 2 and the receive socket.

The second printed circuit board PCB2 may include a via contact (or a via hole). The via hole may be a signal transmission path between the reception unit 122 and a reception controller 121 (refer to FIG. 5). In other words, the via contact may be configured to electrically connect the receive socket with the controller socket. In other words, the receive socket and the controller socket may be connected through the via contact. For example, a control signal generated by the reception controller 121, a local signal LO, or the like may be applied to the reception unit 122 through the via contact. A receive signal RS generated by the reception unit 122 may be applied to the reception controller 121 through the via contact.

The first to nth sockets may be formed at locations spaced apart from each other along a horizontal direction by a first distance. The horizontal direction may be a direction parallel to the top surface and the bottom surface of the second printed circuit board PCB2. For example, the horizontal direction may indicate a horizontal axis direction of a plane formed by the top surface of the second printed circuit board PCB2, a vertical axis direction of the plane, or a direction in which horizontal and vertical axes are combined.

Because the receive antennas 124_1 to 124_n are mounted on the first to nth sockets, they may be formed along the horizontal direction. In other words, the receive antennas 124_1 to 124_n may be linearly arranged on the top surface. The receive antennas 124_1 to 124_n may be connected with the reception unit 122 through each of the signal lines L1 to Ln. For example, the first receive antenna 124_1 may be connected with the reception unit 122 through the signal line L1, and the second receive antenna 124_2 may be connected with the reception unit 122 through the second signal line L2.

Figure 14:
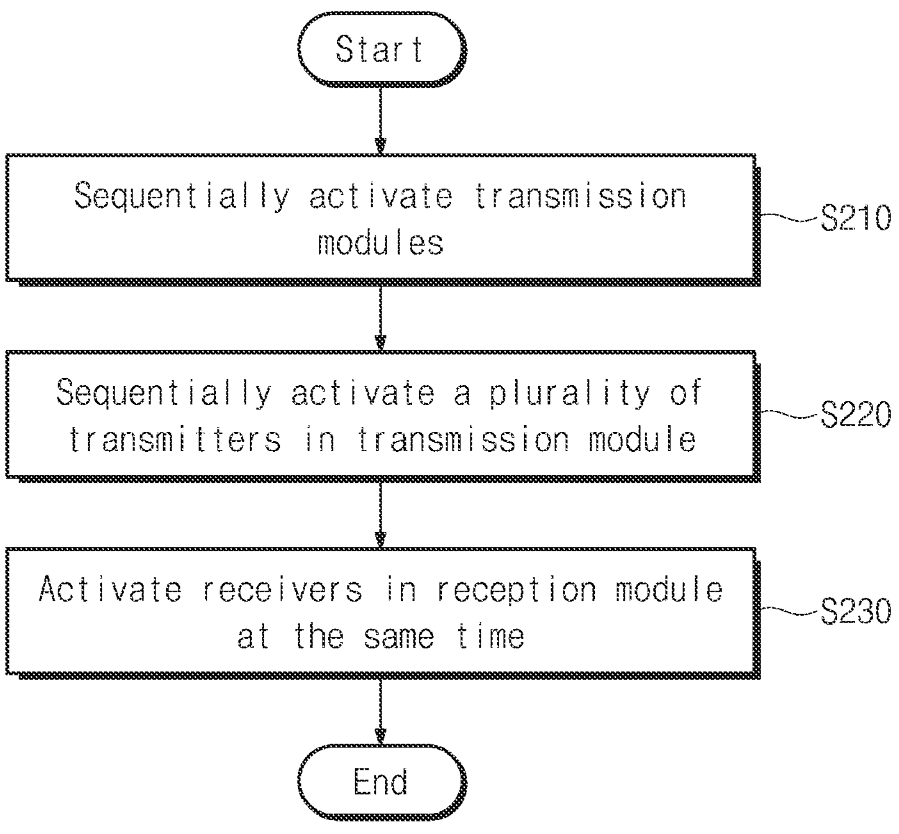
FIG. 14 is a flowchart illustrating an example of an operating method of a radar apparatus of FIG. 2.

FIG. 14 is a flowchart illustrating an example of an operating method of a radar apparatus 100 of FIG. 2. Referring to FIGS. 2 and 14, in operation S110, the radar apparatus 100 may sequentially activate a plurality of transmission modules 110_1 to 110_n (refer to FIG. 2). In other words, the radar apparatus 100 may sequentially operate the plurality of transmission modules 110_1 to 110_n. In detail, the radar apparatus 100 may operate the plurality of transmission modules 110_1 to 110_n based on an activation order (or an operation order).

In operation S120, the radar apparatus 100 may sequentially activate a plurality of transmitters 113_1 to 113_n (refer to FIG. 4) in a transmission module 110 (refer to FIG. 4). In other words, the radar apparatus 100 may sequentially operate the plurality of activated transmitters 113_1 to 113_n of the transmission module 110. In detail, the radar apparatus 100 may operate the plurality of transmitters 113_1 to 113_n based on the activation order (or the operation order). In other words, the activation order may be variable according to a response of a reflected wave RW (refer to FIG. 1). Alternatively, the activation order may be variable according to a response of a receive signal RS.

In operation S130, the radar apparatus 100 may activate a plurality of reception modules 120_1 to 120_n (refer to FIG. 2) at the same time. In other words, the radar apparatus 100 operate the plurality of reception modules 120_1 to 120_n at the same time. In detail, the radar apparatus 100 may operate all of a plurality of receivers 123_1 to 123_n (refer to FIG. 5) of the activated reception module 120 (refer to FIG. 5) at the same time. Alternatively, the radar apparatus 100 may operate some of the plurality of receivers 123_1 to 123_n of the activated reception module 120. When the plurality of activated transmitters radiate a transmission wave through transmit antennas, the plurality of receivers may operate at the same time.

In operation S140, a controller 130 of the radar apparatus 100 may receive a digital signal from the plurality of transmission modules 110_1 to 110_n. In operation S150, the controller 130 may perform a signal processing operation for the digital signal to convert the digital signal into an image. The signal processing operation may include a Fourier transform operation. In performing the signal processing operation, the controller 130 may apply a filter having a different frequency response for each location of the reception module corresponding to the digital signal.

The radar apparatus according to an embodiment of the present disclosure may include a plurality of linear transmission modules and a plurality of linear reception modules. Thus, a high-resolution imaging radar apparatus and an operating method thereof may be provided.

The above-mentioned contents are detailed embodiments for executing the present disclosure. The present disclosure may include embodiments capable of being simply changed in design or being easily changed, as well as the above-mentioned embodiments. Furthermore, the present disclosure may also include technologies capable of being easily modified and executed using embodiments. Therefore, the spirit and scope of the present disclosure is defined not by the above-described embodiments, but by those that are identical or equivalent to the claims of the present disclosure as well as the appended claims, which will be described below.

What is claimed is:

1. An imaging radar apparatus for obtaining an image, the imaging radar apparatus comprising:
a main controller;
a plurality of transmission modules, each of which includes a first printed circuit board, a transmission controller, a plurality of transmitters, and a plurality of transmit antennas; and
a plurality of reception modules, each of which includes a second printed circuit board, a reception controller, a plurality of receivers, and a plurality of receive antennas,
wherein a transmission unit including the plurality of transmitters is disposed on a top surface of the first printed circuit board, the plurality of transmit antennas are linearly arranged on the top surface of the first printed circuit board, and the transmission controller is disposed on a bottom surface of the first printed circuit board,
wherein a reception unit including the plurality of receivers is disposed on a top surface of the second printed circuit board, the plurality of receive antennas are linearly arranged on the top surface of the second printed circuit board, and the reception controller is disposed on a bottom surface of the second printed circuit board,
wherein, in a transmission and reception surface having a structure where polygons are repeatedly arranged, the plurality of transmission modules are arranged on lines of at least one of the polygons of the transmission and reception surface and the plurality of reception modules are arranged on lines of at least one of the polygons of the transmission and reception surface,
wherein the polygon is a hexagon,
wherein a plurality of Y-shaped edges are formed along boundary surfaces where a plurality of hexagons of the transmission and reception surface are adjacent to each other,
wherein the plurality of transmission modules are arranged on a first Y-shaped edge among the plurality of Y-shaped edges and the plurality of reception modules are arranged on a second Y-shaped edge among the plurality of Y-shaped edges, and
wherein
one end of a first transmission module, one end of a second transmission module and one end of a third transmission module are adjacent to each other,
the first transmission module faces a first direction, the second transmission module faces a second direction different from the first direction, and the third transmission module faces a third direction different from the first direction and the second direction,
one end of a fourth transmission module, one end of a fifth transmission module and one end of a sixth transmission module are adjacent to each other,
the fourth transmission module faces the first direction, the fifth transmission module faces the second direction and the sixth transmission module faces the third direction,
one end of a first reception module, one end of a second reception module and one end of a third reception module are adjacent to each other,
the first reception module faces a fourth direction, the second reception module faces a fifth direction different from the fourth direction and the third reception module faces a sixth direction different from the fourth direction and the fifth direction,
one end of a fourth reception module, one end of a fifth reception module and one end of a sixth reception module are adjacent to each other, and
the fourth reception module faces the fourth direction, the fifth reception module faces the fifth direction and the sixth reception module faces the sixth direction.

2. The imaging radar apparatus of claim 1, wherein the transmission controller generates and outputs a first control signal and a reference frequency signal to the plurality of transmitters, the plurality of transmit antennas radiate a transmission wave to an external target, and the plurality of transmitters are connected with the plurality of transmit antennas, respectively, and
wherein the reception controller generates and outputs a second control signal and a local signal to the plurality of receivers, the plurality of receive antennas receive a reflected wave from the external target, and the plurality of receivers are connected with the plurality of receive antennas, respectively.

3. The imaging radar apparatus of claim 2, wherein the transmission controller includes a phase-locked loop (PLL) and controls the reference frequency signal by means of the PLL,
wherein the transmission controller controls a center frequency, transmit power, and modulation of each of the plurality of transmitters by means of the first control signal,
wherein the transmission controller communicates with the main controller, and
wherein the transmission controller is implemented as an integrated circuit chip, and the transmission unit is implemented as an integrated circuit chip.

4. The imaging radar apparatus of claim 3, wherein the transmission controller receives a reference clock signal from the main controller, generates the reference frequency signal based on the reference clock signal, and outputs the reference frequency signal to the transmission unit,
wherein the transmission controller controls a frequency and a phase of the reference frequency signal to generate a first modulation signal in the first control signal, and
wherein the first control signal is an analog signal or a digital signal.

5. The imaging radar apparatus of claim 2, wherein the reception controller includes a phase-locked loop (PLL) and an analog-to-digital converter (ADC),
wherein the reception controller controls the local signal by means of the PLL,
wherein the reception controller controls a gain and sensitivity of each of the plurality of receivers by means of the second control signal,
wherein the reception controller converts a receive signal provided from the plurality of receivers into a digital signal by means of the ADC,
wherein the reception controller communicates with the main controller, and
wherein the reception controller is implemented as an integrated circuit chip, and the reception unit is implemented as an integrated circuit chip.

6. The imaging radar apparatus of claim 5, wherein the reception controller receives a reference clock signal from the main controller, generates the local signal based on the reference clock signal, and outputs the local signal to the reception unit, wherein the reception controller controls a frequency and a phase of the local signal to generate a second modulation signal in the second control signal, wherein the ADC of the reception controller includes a selection unit and a conversion unit, the selection unit selects one of a plurality of receive signals provided from the plurality of receivers, and the conversion unit converts the selected receive signal into a digital signal, and wherein the second control signal is an analog signal or a digital signal.

7. The imaging radar apparatus of claim 1, wherein the transmission controller selectively activates the plurality of transmitters, and the reception controller selectively activates the plurality of receivers.

8. The imaging radar apparatus of claim 1, wherein the transmission controller activates the plurality of transmitters based on an activation order, and the plurality of transmit antennas are activated based on the activation order.

9. The imaging radar apparatus of claim 1, wherein the main controller receives a digital signal from the plurality of reception modules and performs a signal processing operation for the digital signal to generate an image.

10. The imaging radar apparatus of claim 9, wherein the signal processing operation includes a Fourier transform, and wherein the main controller applies a filter having a different frequency response for each location of the reception module, in performing the signal processing operation.

11. An operating method of an imaging radar apparatus, including a main controller, a plurality of transmission modules, each of which includes a first printed circuit board, a transmission controller, a plurality of transmitters, and a plurality of transmit antennas, and a plurality of reception modules, each of which includes a second printed circuit board, a reception controller, a plurality of receivers, and a plurality of receive antennas, for obtaining an image, the operating method comprising:

sequentially activating, by the main controller, the plurality of transmission modules;

sequentially activating, by the transmission controller of the transmission module, the plurality of transmitters of the transmission module; and activating, by the main controller, the plurality of reception module at a same time, wherein a transmission unit including the plurality of transmitters is disposed on a top surface of the first printed circuit board, the plurality of transmit antennas are linearly arranged on the top surface of the first printed circuit board, and the transmission controller is disposed on a bottom surface of the first printed circuit board, wherein a reception unit including the plurality of receivers is disposed on a bottom surface of the second printed circuit board, the plurality of receive antennas are linearly arranged on a top surface of the second printed circuit board, and the reception controller is disposed on the bottom surface of the second printed circuit board, wherein, in a transmission and reception surface having a structure where polygons are repeatedly arranged, the plurality of transmission modules are arranged on lines of at least one of the polygons of the transmission and reception surface and the plurality of reception modules are arranged on lines of at least one of the polygons of the transmission and reception surface, wherein the polygon is a hexagon, wherein a plurality of Y-shaped edges are formed along boundary surfaces where a plurality of hexagons of the transmission and reception surface are adjacent to each other, wherein the plurality of transmission modules are arranged on a first Y-shaped edge among the plurality of Y-shaped edges and the plurality of reception modules are arranged on a second Y-shaped edge among the plurality of Y-shaped edges, and wherein one end of a first transmission module, one end of a second transmission module and one end of a third transmission module are adjacent to each other, the first transmission module faces a first direction, the second transmission module faces a second direction different from the first direction, and the third transmission module faces a third direction different from the first direction and the second direction, one end of a fourth transmission module, one end of a fifth transmission module and one end of a sixth transmission module are adjacent to each other, the fourth transmission module faces the first direction, the fifth transmission module faces the second direction and the sixth transmission module faces the third direction, one end of a first reception module, one end of a second reception module and one end of a third reception module are adjacent to each other, the first reception module faces a fourth direction, the second reception module faces a fifth direction different from the fourth direction and the third reception module faces a sixth direction different from the fourth direction and the fifth direction, one end of a fourth reception module, one end of a fifth reception module and one end of a sixth reception module are adjacent to each other, and the fourth reception module faces the fourth direction, the fifth reception module faces the fifth direction and the sixth reception module faces the sixth direction.

12. The operating method of claim 11, wherein the activating of the plurality of reception modules at the same time by the main controller includes:

activating all the plurality of receivers of each of the plurality of reception modules at the same time or activating some of the plurality of receivers of each of the plurality of reception modules at the same time, and wherein the receivers of the activated reception modules operate at the same time, when a transmit antenna corresponding to the activated transmitter radiates a transmission wave.

13. The operating method of claim 12, wherein the sequential activating of the plurality of transmission modules includes sequentially activating the plurality of transmission modules based on a first activation order, wherein the sequential activating of the plurality of transmitters of the transmission module includes sequentially activating the plurality of transmitters of the transmission module based on a second activation order, and wherein the first and second activation orders are variable according to a response of a reflected wave received through the plurality of receive antennas.

14. The operating method of claim 13, further comprising:

receiving, by the main controller, a digital signal into a receive signal is converted from the plurality of reception modules; and performing, by the main controller, a signal processing operation for the digital signal to convert the digital signal into an image, wherein the signal processing operation includes a Fourier transform, and wherein the main controller applies a filter having a different frequency response for each location of the reception module corresponding to the digital signal, in performing the signal processing operation.

* * * * *